(12) United States Patent
Suemitsu et al.

(10) Patent No.: US 12,455,124 B2
(45) Date of Patent: Oct. 28, 2025

(54) RADIATIVE COOLING DEVICE

(71) Applicant: Osaka Gas Co., Ltd., Osaka (JP)

(72) Inventors: Masahiro Suemitsu, Osaka (JP); Masayuki Sugimoto, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 174 days.

(21) Appl. No.: 18/283,947

(22) PCT Filed: Mar. 24, 2022

(86) PCT No.: PCT/JP2022/013948
§ 371 (c)(1),
(2) Date: Sep. 25, 2023

(87) PCT Pub. No.: WO2022/202991
PCT Pub. Date: Sep. 29, 2022

(65) Prior Publication Data
US 2024/0167776 A1 May 23, 2024

(30) Foreign Application Priority Data
Mar. 26, 2021 (JP) ................................. 2021-054012

(51) Int. Cl.
*F28F 13/18* (2006.01)
*B32B 7/12* (2006.01)
*B32B 15/082* (2006.01)
*B32B 15/20* (2006.01)
*F28F 13/00* (2006.01)

(52) U.S. Cl.
CPC ................ *F28F 13/18* (2013.01); *B32B 7/12* (2013.01); *B32B 15/082* (2013.01); *B32B 15/20* (2013.01); *B32B 2307/302* (2013.01); *B32B 2307/416* (2013.01); *B32B 2307/7376* (2023.05); *F28F 2013/001* (2013.01)

(58) Field of Classification Search
CPC ................................... F28F 13/18; B32B 7/12
See application file for complete search history.

(56) References Cited

U.S. PATENT DOCUMENTS

| 4,337,997 A | 7/1982 | Sadoune et al. |
| 2013/0155497 A1 | 6/2013 | Mochizuki |

(Continued)

FOREIGN PATENT DOCUMENTS

| EP | 3369794 A1 * | 9/2018 | ............ B32B 27/06 |
| EP | 3689596 A1 * | 8/2020 | ........... B32B 15/085 |

(Continued)

*Primary Examiner* — Eric S Ruppert
(74) *Attorney, Agent, or Firm* — The Webb Law Firm

(57) ABSTRACT

Provided is a radiative cooling device that appears white as viewed from a radiative surface side and has increased durability. The radiative cooling device includes an infrared radiative layer A having a radiative surface H for radiating infrared light, a light reflective layer B on a side of the infrared radiative layer A, which is opposite to the radiative surface H, and a protective layer D between the infrared radiative layer A and the light reflective layer B. The infrared radiative layer A is a resin material layer J having a thickness adjusted so that the resin material layer J emits heat radiation energy greater than absorbed solar energy in a wavelength range from 8 μm to 14 μm. The light reflective layer B includes silver or a silver alloy.

20 Claims, 17 Drawing Sheets

(56) References Cited

U.S. PATENT DOCUMENTS

| | | |
|---|---|---|
| 2013/0233302 A1 | 9/2013 | Majima et al. |
| 2016/0007498 A1 | 1/2016 | Park et al. |
| 2017/0248381 A1 | 8/2017 | Yang et al. |
| 2018/0180331 A1 | 6/2018 | Yu et al. |
| 2021/0262745 A1 | 8/2021 | Suemitsu et al. |

FOREIGN PATENT DOCUMENTS

| | | | |
|---|---|---|---|
| JP | 20026124 A | 1/2002 | |
| JP | 2014133403 A | 7/2014 | |
| JP | 201657419 A | 4/2016 | |
| JP | 2018526599 A | 9/2018 | |
| JP | 2019515967 A | 6/2019 | |
| WO | WO-2020022156 A1 * | 1/2020 | ............. C03C 17/36 |
| WO | 2020195743 A1 | 10/2020 | |
| WO | 2020237813 A1 | 12/2020 | |

* cited by examiner

RADIATIVE COOLING DEVICE

CROSS-REFERENCE TO RELATED APPLICATIONS

This application is the United States national phase of International Application No. PCT/JP2022/013948 filed Mar. 24, 2022, and claims priority to Japanese Patent Application No. 2021-054012 filed Mar. 26, 2021, the disclosures of which are hereby incorporated by reference in their entireties.

BACKGROUND OF THE INVENTION

Field of the Invention

The present invention relates to a radiative cooling device including: an infrared radiative layer having a radiative surface for radiating infrared light; a light reflective layer on a side of the infrared radiative layer, which is opposite to the radiative surface; and a protective layer between the infrared radiative layer and the light reflective layer, wherein the infrared radiative layer is a resin material layer that has a thickness adjusted so that the resin material layer emits heat radiation energy greater than absorbed solar energy in a wavelength range from 8 µm to 14 µm, and the light reflective layer includes silver or a silver alloy.

Description of Related Art

Radiative cooling is a phenomenon in which the temperature of a substance decreases as a result of the substance radiating electromagnetic waves such as infrared rays to the surrounding environment. By using this phenomenon, it is possible to configure a radiative cooling device that cools a cooling target without consuming energy such as electricity, for example.

The cooling target can be cooled even under solar radiation during the day as a result of a light reflective layer sufficiently reflecting sunlight.

That is, sunlight incident on a radiative surface of a resin material layer, which is an infrared radiative layer, passes through the resin material layer and a protective layer, and is then reflected by the light reflective layer on a side of the resin material layer, which is opposite to the radiative surface, and is released from the radiative surface to the outside of the system.

That is, the light reflective layer reflects light (ultraviolet light, visible light, infrared light) that has passed through the infrared radiative layer and the protective layer, and causes the light to be radiated from the radiative surface. This avoids a situation in which the light (ultraviolet light, visible light, infrared light) that has passed through the infrared radiative layer and the protective layer is projected onto the cooling target and the cooling target is heated, and thus the cooling target can be cooled even under solar radiation during the day.

In addition to light that has passed through the infrared radiative layer and the protective layer, light radiated from the infrared radiative layer toward the light reflective layer is also reflected by the light reflective layer toward the infrared radiative layer, but in the following description, the light reflective layer is described as being provided for the purpose of reflecting light (ultraviolet light, visible light, infrared light) that has passed through the infrared radiative layer and the protective layer.

Moreover, discoloration of silver or a silver alloy included in the light reflective layer in a short period of time can be suppressed by the protective layer.

That is, if the radiative cooling device does not include the protective layer, silver or a silver alloy included in the light reflective layer may be discolored in a short period of time and fail to appropriately exhibit a light reflecting function, as a result of radicals generated in the resin material layer reaching silver or the silver alloy included in the light reflective layer, or moisture that has permeated through the resin material layer reaching silver or the silver alloy included in the light reflective layer.

As a conventional example of such a radiative cooling device, there is a radiative cooling device in which a dimethyl siloxane resin, a vinylidene fluoride resin, an acrylic acid resin, or a methyl methacrylate resin is used as a resin material of the resin material layer (see Patent Document 1, for example).

Patent Document 1 discloses mixing a filler made of an inorganic material in the resin material layer. When a filler made of an inorganic material is mixed in the resin material layer, the radiative cooling device appears white as viewed from the radiative surface side due to a light scattering effect of the inorganic filler, and the appearance of the radiative cooling device is improved.

Note that Patent Document 1 describes calcium carbonate, aluminum oxide, silicon dioxide, and silicon nitride as inorganic fillers.

PATENT DOCUMENTS

Patent Document 1: JP 2018-526599A

SUMMARY OF THE INVENTION

In conventional radiative cooling devices, a filler made of an inorganic material is mixed in the resin material layer, and accordingly, the radiative cooling device may be quick to deteriorate, for example, the reflectance of the radiative cooling device may be quick to deteriorate, and there is demand for improvement.

That is, a filler mixed in the resin material layer is likely to be affected by moisture included in air or rain. In the case of a filler made of calcium carbonate or magnesium oxide, for example, there is a risk that the filler will deteriorate as a result of reacting with moisture, and consequently the radiative cooling device will deteriorate early, for example, the reflectance of the radiative cooling device will decrease early.

The present invention was made in view of the above circumstances, and it is an object thereof to provide a radiative cooling device that appears white as viewed from the radiative surface side and has increased durability.

A radiative cooling device according to the present invention includes: an infrared radiative layer having a radiative surface for radiating infrared light;
  a light reflective layer on a side of the infrared radiative layer, which is opposite to the radiative surface; and
  a protective layer between the infrared radiative layer and the light reflective layer,
  wherein the infrared radiative layer is a resin material layer that has a thickness adjusted so that the resin material layer emits heat radiation energy greater than absorbed solar energy in a wavelength range from 8 µm to 14 µm, the light reflective layer includes silver or a silver alloy,
the radiative cooling device further includes an adhesive layer between the resin material layer and the protective layer, the adhesive layer joining the resin material layer to the protective layer, and
the adhesive layer includes a filler made of an inorganic material.

That is, the filler made of an inorganic material is mixed in the adhesive layer joining the resin material layer to the protective layer. Since the adhesive layer is protected by the resin material layer, moisture included in air and rain is kept from permeating through the adhesive layer, and the inorganic filler mixed in the adhesive layer is kept from being affected by moisture included in air and rain. Consequently, the radiative cooling device can be kept from deteriorating early, and can have increased durability.

Moreover, in the case where the inorganic filler is mixed in the adhesive layer, which joins the resin material layer to the protective layer, the inorganic filler mixed in the adhesive layer is visible through the transparent resin material layer when the radiative cooling device is viewed from the radiative surface side, and therefore, the radiative cooling device appears white as viewed from the radiative surface side due to a light scattering effect of the inorganic filler, and the appearance of the radiative cooling device can be improved.

In the case where the adhesive layer joining the resin material layer to the protective layer is provided between the infrared radiative layer and the protective layer, the state where the resin material layer, the protective layer, and the light reflective layer are stacked on one another can be obtained by forming the light reflective layer and the protective layer in a layered manner and joining the resin material layer, which has been separately formed, to the protective layer with use of the adhesive layer.

In the case where the adhesive layer is provided between the resin material layer and the protective layer, radicals are generated in the adhesive layer as well, but the protective layer keeps the radicals generated in the adhesive layer from reaching the light reflective layer.

In short, with the characteristic configuration of the radiative cooling device according to the present invention, it is possible to increase durability of the radiative cooling device while making the radiative cooling device appear white as viewed from the radiative surface side.

In a characteristic configuration of the radiative cooling device according to the present invention, the adhesive layer includes an adhesive agent or a pressure-sensitive adhesive agent selected from the group consisting of a urethane adhesive agent, a urethane pressure-sensitive adhesive agent, an acrylic adhesive agent, an acrylic pressure-sensitive adhesive agent, an ethylene vinyl acetate adhesive agent, and an ethylene vinyl acetate pressure-sensitive adhesive agent.

That is, a urethane adhesive agent, a urethane pressure-sensitive adhesive agent, an acrylic adhesive agent, an acrylic pressure-sensitive adhesive agent, an ethylene vinyl acetate adhesive agent, or an ethylene vinyl acetate pressure-sensitive adhesive agent is used to form the adhesive layer, and these adhesive agents and pressure-sensitive adhesive agents are highly transparent to sunlight.

That is, although the radiative cooling device includes the adhesive layer, the radiative cooling device can exhibit a radiative cooling effect appropriately and appears white as viewed from the radiative surface side.

In a characteristic configuration of the radiative cooling device according to the present invention, the filler is included in an amount of 0.1 to 40 wt % relative to the adhesive layer.

That is, the amount of filler relative to the adhesive layer is 0.1 to 40 wt %, and accordingly, it is possible to appropriately make the radiative cooling device appear white as viewed from the radiative surface side.

In a characteristic configuration of the radiative cooling device according to the present invention, the filler includes any one selected from the group consisting of silicon dioxide, titanium oxide, aluminum oxide, magnesium oxide, and calcium carbonate.

That is, the filler includes any one selected from the group consisting of silicon dioxide, titanium oxide, aluminum oxide, magnesium oxide, and calcium carbonate, and accordingly, it is possible to appropriately make the radiative cooling device appear white as viewed from the radiative surface side.

In a characteristic configuration of the radiative cooling device according to the present invention, the filler includes titanium oxide.

That is, titanium oxide that does not exhibit photocatalytic activity is used, and therefore, it is possible to appropriately suppress deterioration of the resin material layer adjacent to the adhesive layer due to the filler mixed in the adhesive layer.

In a characteristic configuration of the radiative cooling device according to the present invention, the titanium oxide is provided with at least one of an alumina coating, a silica coating, and a zirconia coating.

That is, it is possible to appropriately keep the filler from exhibiting photocatalytic activity by providing the titanium oxide with at least one of an alumina coating, a silica coating, and a zirconia coating, and accordingly, it is possible to more appropriately suppress deterioration of the resin material layer adjacent to the adhesive layer.

In a characteristic configuration of the radiative cooling device according to the present invention, the thickness of the resin material layer is adjusted so that the resin material layer has:
light absorption properties that allow for a wavelength average absorptivity of 13% or less in a wavelength range from 0.4 µm to 0.5 µm, a wavelength average absorptivity of 4% or less in a wavelength range from 0.5 µm to 0.8 µm, a wavelength average absorptivity of 1% or less in a wavelength range from 0.8 µm to 1.5 µm, and a wavelength average absorptivity of 40% or less in a wavelength range from 1.5 µm to 2.5 µm; and
heat radiation properties that allow for a wavelength average emissivity of 40% or more in the wavelength range from 8 µm to 14 µm.

Note that the wavelength average absorptivity in the wavelength range from 0.4 µm to 0.5 µm refers to an average value of absorptivities at respective wavelengths within the range from 0.4 µm to 0.5 µm. The same applies to the wavelength average absorptivity in the wavelength range from 0.5 µm to 0.8 µm, the wavelength average absorptivity in the wavelength range from 0.8 µm to 1.5 µm, and the wavelength average absorptivity in the wavelength range from 1.5 µm to 2.5 µm. Also, similar descriptions including the description of emissivity refer to similar average values, and this applies to the following description of the present specification.

That is, the absorptivity and the emissivity (light emissivity) of the resin material layer vary according to the thickness of the resin material layer. Therefore, the thickness of the resin material layer needs to be adjusted in such a manner that the resin material layer does not absorb sunlight as far as possible and radiates a large amount of heat in the wavelength band of so-called atmospheric window (light wavelength range from 8 µm to 14 µm).

Specifically, from the viewpoint of absorptivity (light absorption properties) of the resin material layer for sunlight, the wavelength average absorptivity in the wavelength range from 0.4 µm to 0.5 µm needs to be 13% or less, the wavelength average absorptivity in the wavelength range from 0.5 µm to 0.8 µm needs to be 4% or less, the wavelength average absorptivity in the wavelength range from 0.8 µm to 1.5 µm needs to be 1% or less, and the wavelength average absorptivity in the wavelength range from 1.5 µm to 2.5 µm needs to be 40% or less. Note that a wavelength average absorptivity in a wavelength range from 2.5 µm to 4 µm may be 100% or less.

In the case of such an absorptivity distribution, the absorptivity for sunlight is 10% or less, which corresponds to an energy of 100 W or less.

The absorptivity for sunlight increases as the film thickness of the resin material layer is increased. When the resin material layer is made thick, the emissivity in the atmospheric window becomes approximately 1, and the amount of heat radiated toward the universe at that time is 125 W/m² to 160 W/m².

As described above, the amount of sunlight absorbed by the light reflective layer is preferably 50 W/m² or less.

Accordingly, cooling progresses if the sum of amounts of sunlight absorbed by the resin material layer and the light reflective layer is 150 W/m² or less and the atmosphere is in good conditions. It is preferable to use a resin material layer that has a small absorptivity in the vicinity of a peak value of the sunlight spectrum as described above.

Also, from the viewpoint of infrared radiation (heat radiation properties) of the resin material layer, the wavelength average emissivity in the wavelength range from 8 µm to 14 µm needs to be 40% or more.

That is, in order to emit heat of about 50 W/m² absorbed from sunlight by the light reflective layer to the universe from the resin material layer, the resin material layer needs to radiate heat more than or equal to the absorbed heat.

For example, when the ambient temperature is 30° C., the maximum heat radiation in the atmospheric window of the wavelength range from 8 µm to 14 µm is 200 W/m² (calculated with the emissivity taken as 1). This value can be obtained in an environment in which the air is thin and very dry, such as an environment on a high mountain, in cloudless weather. When compared with a high mountain, the thickness of the atmosphere increases in a lowland, for example, and accordingly, the wavelength band of the atmospheric window becomes narrower and the transmittance decreases. This is said as "the atmospheric window becoming narrower".

Also, the radiative cooling device is actually used in a humid environment, and the atmospheric window becomes narrower in such a case as well. When the radiative cooling device is used in a lowland, heat radiation in the atmospheric window band is estimated to be 160 W/m² (calculated with the emissivity taken as 1) at 30° C. under good conditions.

Moreover, when there is haze or smog in the sky, as is often the case in Japan, the atmospheric window further becomes narrower and radiation to the universe becomes about 125 W/m².

In view of the foregoing, the radiative cooling device cannot be used in a lowland in the mid-latitude area unless the wavelength average emissivity in the wavelength range from 8 µm to 14 µm is 40% or more (heat radiation intensity in the atmospheric window band is 50 W/m² or more).

Therefore, when the thickness of the resin material layer is adjusted so as to fall within the range of optical prescriptions described above, the amount of heat output in the atmospheric window becomes greater than the amount of heat input through absorption of sunlight, and radiative cooling can be performed in an outdoor environment even under solar radiation during the day.

In short, with the above-described characteristic configuration of the radiative cooling device according to the present invention, the amount of heat output in the atmospheric window becomes greater than the amount of heat input through absorption of sunlight, and radiative cooling can be performed in an outdoor environment even under solar radiation.

In a characteristic configuration of the radiative cooling device according to the present invention, the resin material layer includes a vinyl chloride resin or a vinylidene chloride resin as a resin material, and the resin material layer has a thickness of 10 µm or more and 100 µm or less.

That is, sufficient heat radiation can be obtained in the atmospheric window range with use of a vinyl chloride resin (polyvinyl chloride) or a vinylidene chloride resin (polyvinylidene chloride) with a thickness of 10 µm or more and 100 µm or less.

Heat radiation properties of the vinyl chloride resin and the vinylidene chloride resin are equivalent to those of a fluorocarbon resin and silicone rubber with which a large amount of heat radiation can be obtained in the atmospheric window range, and the vinyl chloride resin and the vinylidene chloride resin are far more inexpensive than these resins, and therefore are effective to produce, at a low cost, a radiative cooling device whose temperature falls below the ambient temperature in direct sunlight.

Furthermore, a thin film of vinyl chloride resin or vinylidene chloride resin softens when a plasticizer is added thereto, and accordingly, even if another object comes into contact with the film, the film flexibly deforms to conform to the object and is kept from being damaged, and therefore, a good appearance of the film can be maintained for a long period of time. Note that a thin film of fluorocarbon resin is hard, and accordingly cannot flexibly deform and is likely to be damaged when another object comes into contact therewith, and therefore, it is difficult to maintain a good appearance of the film.

Moreover, when a plasticizer is added to a vinyl chloride-based resin, the vinyl chloride-based resin deforms when heated to 80° C. or more, and accordingly, even if there is a scratch is formed in a surface of the film, the scratch disappears and the surface becomes smooth. That is, the film can repair the scratch by itself. The fluorocarbon resin and silicone rubber do not have such characteristics. Owing to the characteristics of the soft vinyl chloride-based resin, a good appearance can be maintained for a long period of time. Consequently, radiative cooling properties can be maintained for a long period of time.

Moreover, the vinyl chloride-based resin is flame retardant and unlikely to undergo biodegradation, and therefore can be preferably used as the resin material to form the resin material layer of the radiative cooling device that is used outdoors.

The vinyl chloride-based resin used in the present invention is a homopolymer of vinyl chloride or vinylidene chloride or a copolymer of vinyl chloride or vinylidene chloride, and produced with use of a conventionally-known polymerization method.

In short, with the above-described characteristic configuration of the radiative cooling device according to the present invention, it is possible to impart flexibility while reducing the cost.

In a characteristic configuration of the radiative cooling device according to the present invention, the resin material layer includes a vinyl fluoride resin or a vinylidene fluoride resin as a resin material, and the resin material layer has a thickness of 300 μm or less.

That is, a large amount of heat radiation can be obtained in the atmospheric window range with use of a vinyl fluoride resin or a vinylidene fluoride resin, and therefore, these resins are effective to produce a radiative cooling device whose temperature falls below the ambient temperature in direct sunlight.

From the viewpoint of practical use of the radiative cooling device, the thinner the resin material layer, the better. The thermal conductivity of a resin material is generally lower than those of metal, glass, and the like. In order to effectively cool the cooling target, it is preferable that the resin material layer has the minimum required thickness. Heat radiation in the atmospheric window increases as the film thickness of the resin material layer is increased, and heat radiation energy in the atmospheric window is saturated when the film thickness exceeds a certain thickness.

Although the film thickness of the resin material layer at which heat radiation energy is saturated varies according to the resin material, in the case of a vinyl fluoride resin or a vinylidene fluoride resin, heat radiation energy is generally sufficiently saturated when the film thickness is 300 μm. Therefore, from the viewpoint of thermal conductivity, it is desirable to set the film thickness of the resin material layer to be no greater than 300 μm.

Furthermore, even when the thickness is about 100 μm, sufficient heat radiation can be obtained in the atmospheric window range although heat radiation is not saturated. The smaller the thickness is, the higher the thermal transmittance becomes and the more effectively the temperature of the cooling target can be reduced, and therefore, in the case of a vinyl fluoride resin or a vinylidene fluoride resin, the thickness may be set to about 100 μm or less.

Note that in the case of a vinyl fluoride resin or a vinylidene fluoride resin, absorption coefficients of a carbon-silicon bond, a carbon-chlorine bond, a carbon-oxygen bond, an ester bond, and an ether bond are larger than an absorption coefficient of a C—F bond. Naturally, it is desirable to set the film thickness to be no greater than 300 μm from the viewpoint of thermal conductivity, but if the film thickness is further reduced to increase the thermal conductivity, an even greater radiative cooling effect can be expected.

In short, with the characteristic configuration of the radiative cooling device according to the present invention, it is possible to improve the radiative cooling effect with use of a vinyl fluoride resin or a vinylidene fluoride resin.

In a characteristic configuration of the radiative cooling device according to the present invention, the resin material layer includes a vinyl chloride-based resin as a resin material in which a plasticizer is mixed, and the plasticizer is any of phthalic acid esters, aliphatic dibasic acid esters, and phosphoric acid esters.

That is, sufficient heat radiation can be obtained in the atmospheric window range with use of a vinyl chloride-based resin.

Heat radiation properties of a vinyl chloride resin and a vinylidene chloride resin are equivalent to those of a fluorocarbon resin and silicone rubber with which a large amount of heat radiation can be obtained in the atmospheric window range, and the vinyl chloride resin and the vinylidene chloride resin are far more inexpensive than these resins, and therefore are effective to produce, at a low cost, a radiative cooling device whose temperature falls below the ambient temperature in direct sunlight.

Furthermore, a thin film of vinyl chloride resin or vinylidene chloride resin softens when a plasticizer is added thereto, and accordingly, even if another object comes into contact with the film, the film flexibly deforms to conform to the object and is kept from being damaged, and therefore, a good appearance of the film can be maintained for a long period of time. Note that a thin film of fluorocarbon resin is hard, and accordingly cannot flexibly deform and is likely to be damaged when another object comes into contact therewith, and therefore, it is difficult to maintain a good appearance of the film.

Moreover, when a plasticizer is added to a vinyl chloride-based resin, the vinyl chloride-based resin deforms when heated to 80° C. or more, and accordingly, even if a scratch is formed in a surface of the film, the scratch disappears and the surface becomes smooth. That is, the film can repair the scratch by itself. The fluorocarbon resin and silicone rubber do not have such characteristics. Owing to the characteristics of the soft vinyl chloride-based resin, a good appearance can be maintained for a long period of time. Consequently, radiative cooling properties can be maintained for a long period of time.

Moreover, the vinyl chloride-based resin is flame retardant and unlikely to undergo biodegradation, and therefore can be preferably used as the resin material to form the resin material layer of the radiative cooling device that is used outdoors.

The vinyl chloride-based resin used in the present invention is a homopolymer of vinyl chloride or vinylidene chloride or a copolymer of vinyl chloride or vinylidene chloride, and produced through a conventionally-known polymerization method.

Moreover, the plasticizer mixed in the vinyl chloride-based resin is any of phthalic acid esters, aliphatic dibasic acid esters, and phosphoric acid esters, and accordingly, the plasticizer does not absorb ultraviolet rays (in a wavelength range from 295 nm to 400 nm) included in sunlight, and therefore, the weather resistance of the vinyl chloride-based resin in which the plasticizer is mixed can be increased.

That is, if the plasticizer mixed in the vinyl chloride-based resin absorbs ultraviolet rays, there is a risk that hydrolysis of the plasticizer will progress, and consequently, the vinyl chloride-based resin will be colored (to brown) as a result of dehydrochlorination or the like, and mechanical strength will decrease. However, the plasticizer does not absorb ultraviolet rays included in sunlight, and therefore, it is possible to increase the weather resistance of the vinyl chloride-based resin in which the plasticizer is mixed.

In short, with the above-described characteristic configuration of the radiative cooling device according to the present invention, it is possible to impart flexibility and increase the weather resistance while reducing the cost.

In a characteristic configuration of the radiative cooling device according to the present invention, the plasticizer is mixed in an amount of 1 part by weight or more and 200 parts by weight or less relative to 100 parts by weight of the vinyl chloride-based resin.

That is, the plasticizer is mixed in an amount of 1 part by weight or more and 200 parts by weight or less relative to 100 parts by weight of the vinyl chloride-based resin, and accordingly, it is possible to impart adequate flexibility to the vinyl chloride-based resin.

In a characteristic configuration of the radiative cooling device according to the present invention, the plasticizer includes a phosphoric acid ester that is a phosphoric acid triester or an aromatic phosphoric acid ester.

That is, by using a phosphoric acid triester or an aromatic phosphoric acid ester as a phosphoric acid ester that functions as the plasticizer, it is possible to appropriately keep the plasticizer from absorbing ultraviolet rays included in sunlight.

In a characteristic configuration of the radiative cooling device according to the present invention, the light reflective layer has a reflectance of 90% or more in a wavelength range from 0.4 μm to 0.5 μm, and a reflectance of 96% or more with respect to light having a wavelength longer than 0.5 μm.

The spectrum of sunlight spans from a wavelength of 0.295 μm to a wavelength of 4 μm, and the intensity increases as the wavelength increases from 0.4 μm, and the intensity is particularly high in a wavelength range from 0.5 μm to 2.5 μm.

When the light reflective layer has reflective properties that allow for a reflectance of 90% or more in the wavelength range from 0.4 μm to 0.5 μm and a reflectance of 96% or more for light having a wavelength longer than 0.5 μm, solar energy absorbed by the light reflective layer is as small as about 5% or less.

Consequently, solar energy absorbed by the light reflective layer at the time of meridian transit in summer can be suppressed to about 50 W/m$^2$ or less, and the resin material layer can favorably perform radiative cooling.

Note that, in the present specification, the spectrum of sunlight is in accordance with the standard of AM1.5G, unless otherwise stated.

In short, with the above-described characteristic configuration of the radiative cooling device according to the present invention, it is possible to suppress absorption of solar energy by the light reflective layer and allow the resin material layer to favorably perform radiative cooling.

In a characteristic configuration of the radiative cooling device according to the present invention, the light reflective layer includes silver or a silver alloy and has a thickness of 50 nm or more.

In order to make the light reflective layer have the reflective properties described above, i.e., a reflectance of 90% or more in the wavelength range from 0.4 μm to 0.5 μm and a reflectance of 96% or more for light having a wavelength longer than 0.5 μm, silver or a silver alloy needs to be used as a reflective material that constitutes the radiative surface side portion of the light reflective layer.

In a case where sunlight is to be reflected only by silver or a silver alloy in such a manner as to satisfy the reflective properties described above, a thickness of 50 nm or more is required.

In short, with the above-described characteristic configuration of the radiative cooling device according to the present invention, it is possible to appropriately suppress absorption of solar energy by the light reflective layer and allow the resin material layer to favorably perform radiative cooling.

In a characteristic configuration of the radiative cooling device according to the present invention, the light reflective layer has a layered structure including (i) silver or a silver alloy adjacent to the protective layer and (ii) aluminum or an aluminum alloy apart from the protective layer.

That is, in order to make the light reflective layer have the reflectance characteristics described above, it is also possible to adopt a layered structure including silver or a silver alloy and aluminum or an aluminum alloy. In this case as well, it is necessary to use silver or a silver alloy as the reflective material on the radiative surface side. In this case, the thickness of silver needs to be 10 nm or more, and the thickness of aluminum needs to be 30 nm or more.

Since aluminum or an aluminum alloy is inexpensive compared with silver or a silver alloy, it is possible to reduce the cost of the light reflective layer while making the light reflective layer have appropriate reflectance characteristics.

That is, when a layered structure including silver or a silver alloy and aluminum or an aluminum alloy is adopted for the light reflective layer and the thickness of silver or the silver alloy, which is expensive, is reduced to reduce the cost of the light reflective layer, it is possible to reduce the cost of the light reflective layer while making the light reflective layer have appropriate reflectance characteristics.

In short, with the characteristic configuration of the radiative cooling device according to the present invention, it is possible to reduce the cost of the light reflective layer while making the light reflective layer have appropriate reflectance characteristics.

In a characteristic configuration of the radiative cooling device according to the present invention, the protective layer includes a polyolefin resin and has a thickness of 300 nm or more and 40 μm or less, or includes a polyethylene terephthalate resin and has a thickness of 17 μm or more and 40 μm or less.

That is, the protective layer is formed from a polyolefin resin with a thickness of 300 nm or more and 40 μm or less or an ethylene terephthalate resin with a thickness of 17 μm or more and 40 μm or less, and accordingly, the protective layer is flexible and is suitable to impart flexibility to the radiative cooling device. Moreover, the protective layer suppresses discoloration of silver or a silver alloy included in the light reflective layer even under solar radiation during the day, and accordingly, the radiative cooling device can exhibit a cooling function even under solar radiation during the day while sunlight is appropriately reflected by the light reflective layer.

In a case where the protective layer is not provided, there is a risk of the light reflective layer failing to appropriately exhibit its light reflecting function as a result of silver or a silver alloy included in the light reflective layer being discolored in a short period of time due to radicals generated in the resin material layer reaching silver or the silver alloy included in the light reflective layer or moisture that has permeated through the resin material layer reaching silver or the silver alloy included in the light reflective layer. However, when the protective layer is provided, it is possible to keep silver or the silver alloy included in the light reflective layer from being discolored in a short period of time.

The following is an additional description of suppression of discoloration of silver or a silver alloy included in the light reflective layer by the protective layer.

In the case where the protective layer is formed from a polyolefin resin with a thickness of 300 nm or more and 40 μm or less, the protective layer is unlikely to deteriorate by absorbing ultraviolet rays because the polyolefin resin is a synthetic resin that has an absorptivity of 10% or less for ultraviolet rays over the entire wavelength range of ultraviolet rays from 0.3 μm to 0.4 μm.

Moreover, since the thickness of the polyolefin resin forming the protective layer is 300 nm or more, the protective layer favorably exhibits a blocking function of blocking radicals generated in the resin material layer to keep the radicals from reaching silver or the silver alloy included in the light reflective layer and blocking moisture that has permeated through the resin material layer to keep the moisture from reaching silver or the silver alloy included in the light reflective layer, and thus discoloration of silver or the silver alloy included in the light reflective layer can be suppressed.

That is, when ultraviolet rays are absorbed by the protective layer formed from the polyolefin resin, the protective layer deteriorates while forming radicals on the side of its surface apart from the light reflective layer, but the generated radicals do not reach the light reflective layer because the protective layer has a thickness of 300 nm or more. Also, although the protective layer deteriorates while forming radicals, the progress of deterioration is slow because absorption of ultraviolet rays is low, and therefore, the protective layer exhibits the above-described blocking function for a long period of time.

In the case where the protective layer is formed from an ethylene terephthalate resin with a thickness of 17 µm or more and 40 µm or less, the ethylene terephthalate resin is a resin material that has a higher absorptivity for ultraviolet rays than the polyolefin resin in the wavelength range of ultraviolet rays from 0.3 µm to 0.4 µm. However, the protective layer has a thickness of 17 µm or more, and accordingly, the protective layer favorably exhibits the blocking function of blocking radicals generated in the resin material layer to keep the radicals from reaching silver or the silver alloy included in the light reflective layer and blocking moisture that has permeated through the resin material layer to keep the moisture from reaching silver or the silver alloy included in the light reflective layer for a long period of time, and thus discoloration of silver or the silver alloy included in the protective layer can be suppressed.

That is, the protective layer formed from the ethylene terephthalate resin deteriorates by absorbing ultraviolet rays while forming radicals on the side of its surface apart from the light reflective layer, but the generated radicals do not reach the light reflective layer because the protective layer has a thickness of 17 µm or more. Also, although the protective layer deteriorates while forming radicals, the protective layer exhibits the blocking function for a long period of time because the thickness is 17 µm or more.

Note that the upper limit value of the thickness of the protective layer is set for the cases where the protective layer is formed from the polyolefin resin or the ethylene terephthalate resin in order to avoid a situation in which the protective layer exhibits thermal insulation properties, which do not contribute to radiative cooling, as far as possible. That is, as the thickness of the protective layer is increased, the protective layer exhibits thermal insulation properties, which do not contribute to radiative cooling, and therefore, the upper limit value of the thickness is set to prevent the protective layer from exhibiting thermal insulation properties, which do not contribute to radiative cooling, as far as possible while allowing the protective layer to exhibit the function of protecting the light reflective layer.

In short, with the characteristic configuration of the radiative cooling device according to the present invention, it is possible to suppress discoloration of silver or a silver alloy included in the light reflective layer in a short period of time.

In a characteristic configuration of the radiative cooling device according to the present invention, the resin material layer, the protective layer, and the light reflective layer are stacked on one another in a form of a film.

That is, the resin material layer, the protective layer, and the light reflective layer are stacked on one another in the form of a film. That is, the radiative cooling device formed by stacking the resin material layer, the protective layer, and the light reflective layer is produced as a radiative cooling film.

The resin material layer and the protective layer are flexible, and accordingly, when the light reflective layer is formed as a thin film so as to be flexible, the radiative cooling device (radiative cooling film) has flexibility.

Therefore, it is possible to favorably impart radiative cooling properties to external walls of existing outdoor facilities or the like through post attachment of the film-shaped radiative cooling device (radiative cooling film) having flexibility.

In short, with the above-described characteristic configuration of the radiative cooling device according to the present invention, it is possible to favorably impart radiative cooling properties to existing facilities through post attachment of the radiative cooling device.

In a characteristic configuration of the radiative cooling device according to the present invention, the resin material layer has a front surface and a rear surface that have irregularities.

It is possible to provide the resin material layer with a light scattering configuration by forming irregularities in both of the front and rear surfaces of the resin material layer.

With the light scattering configuration, it is possible to suppress glare on the radiative surface when the radiative surface is seen.

Irregularities can be formed in both of the front and rear surfaces of the resin material layer through embossing processing, processing for scratching the surfaces, or the like.

Since the adhesive layer is disposed between the resin material layer and the protective layer, the resin material layer and the protective layer can be joined appropriately by the adhesive layer even if irregularities are formed in the rear surface of the resin material layer.

In short, with the above-described characteristic configuration of the radiative cooling device according to the present invention, it is possible to suppress glare on the radiative surface and appropriately join the resin material layer and the protective layer.

DESCRIPTION OF THE INVENTION

The following describes an embodiment of the present invention based on the drawings.

[Basic Configuration of Radiative Cooling Device]

Figure 1:
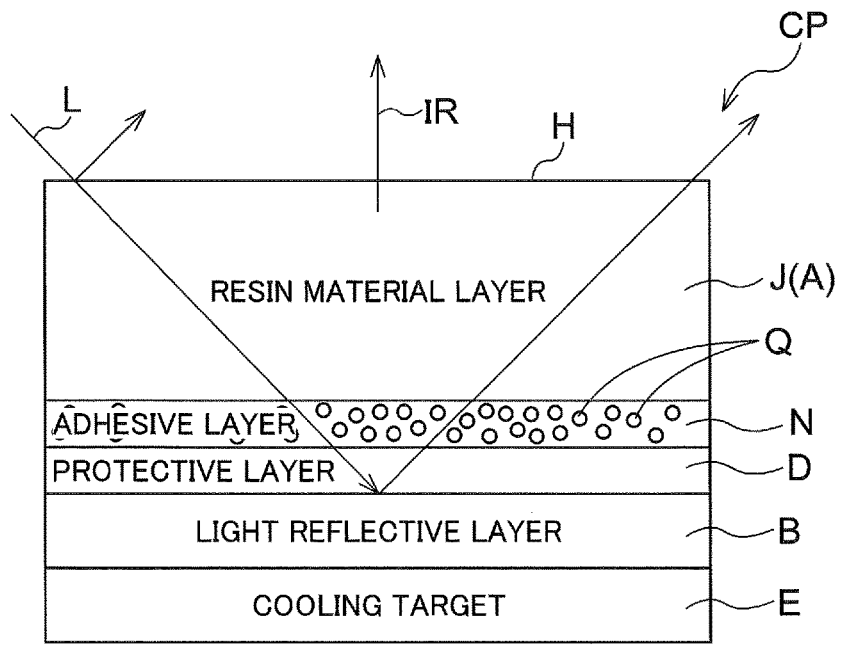
FIG. 1 is a diagram showing a basic configuration of a radiative cooling device.

As shown in FIG. 1, a radiative cooling device CP includes an infrared radiative layer A having a radiative surface H for radiating infrared light IR, a light reflective layer B on a side of the infrared radiative layer A, which is the side opposite to the radiative surface H, and a protective layer D between the infrared radiative layer A and the light reflective layer B. The infrared radiative layer A, the light reflective layer B, and the protective layer D are stacked on one another. The radiative cooling device CP further includes an adhesive layer N between a resin material layer J and the protective layer D. The adhesive layer N joins the resin material layer J to the protective layer D, and a filler Q made of an inorganic material is mixed in the adhesive layer N.

The radiative cooling device CP is formed in the form of a film. That is, the radiative cooling device CP is configured as a radiative cooling film.

Note that FIG. 1 schematically shows the basic configuration of the radiative cooling device CP, and the relationship between the thickness of the infrared radiative layer A, the thickness of the adhesive layer N, the thickness of the protective layer D, and the thickness of the light reflective layer B differs from the actual relationship. Also, the relationship between the thickness of the adhesive layer N and the size of the filler Q mixed therein differs from the actual relationship.

The filler Q is omitted in FIGS. 8, 9, 17, etc., which will be described later.

The light reflective layer B reflects light L, such as sunlight, that has passed through the infrared radiative layer A and the protective layer D. The light reflective layer B has reflective properties that allow for a reflectance of 90% or more in a wavelength range from 0.4 μm to 0.5 μm and a reflectance of 96% or more for light having a wavelength longer than 0.5 μm.

The spectrum of sunlight spans from a wavelength of 0.295 μm (295 nm) to a wavelength of 4 μm (4000 nm), and the intensity increases as the wavelength increases from 0.4 μm (400 nm), and the intensity is particularly high in a wavelength range from 0.5 μm (500 nm) to 1.8 μm (1800 nm).

In the present embodiment, light L encompasses ultraviolet light (ultraviolet rays), visible light, and infrared light. When these are described in terms of the wavelength of light, which is electromagnetic waves, the light L encompasses electromagnetic waves having wavelengths of 10 nm to 20000 nm (electromagnetic waves having wavelengths of 0.01 μm to 20 μm). In the present specification, the wavelength range of ultraviolet light (ultraviolet rays) is taken as a range from 295 nm (0.295 μm) to 400 nm (0.4 μm).

Since the light reflective layer B exhibits the reflective properties that allow for a reflectance of 90% or more in the wavelength range from 0.4 μm to 0.5 μm and a reflectance of 96% or more for light having a wavelength longer than 0.5 μm, solar energy absorbed by the light reflective layer B of the radiative cooling device CP (radiative cooling film) can be suppressed to 5% or less. That is, solar energy absorbed at the time of meridian transit in summer can be suppressed to about 50 W.

The light reflective layer B is constituted by silver or a silver alloy or has a layered structure constituted by silver or a silver alloy adjacent to the protective layer D and aluminum or an aluminum alloy apart from the protective layer D, and is flexible. Details of the light reflective layer B will be described later.

The infrared radiative layer A is configured as the resin material layer J that has a thickness adjusted so that the resin material layer J emits heat radiation energy greater than absorbed solar energy in the wavelength range from 8 μm to 14 μm.

Although details of the resin material layer J will be described later, vinyl chloride-based resins (a vinyl chloride resin and a vinylidene chloride resin), a vinyl fluoride resin, and a vinylidene fluoride resin can be preferably used as transparent resin materials to form the resin material layer J, for example, and a vinyl chloride-based resin in which a plasticizer is mixed can also be preferably used.

A urethane adhesive agent, a urethane pressure-sensitive adhesive agent, an acrylic adhesive agent, an acrylic pressure-sensitive adhesive agent, an ethylene vinyl acetate adhesive agent, an ethylene vinyl acetate pressure-sensitive adhesive agent, or the like can be preferably used to form the adhesive layer.

That is, examples of an adhesive agent (pressure-sensitive adhesive agent) used for the adhesive layer N include a urethane adhesive agent (pressure-sensitive adhesive agent), an acrylic adhesive agent (pressure-sensitive adhesive agent), and an EVA (ethylene vinyl acetate) adhesive agent (pressure-sensitive adhesive agent), and an adhesive agent (pressure-sensitive adhesive agent) that is highly transparent to sunlight is used.

Note that the adhesive layer N has a thickness of about 10 μm, for example.

Inorganic materials such as silicon dioxide ($SiO_2$), titanium oxide (TiO), aluminum oxide ($Al_2O_3$), magnesium oxide (MgO), and calcium carbonate ($CaCO_3$) can be preferably used as the filler Q mixed in the adhesive layer N.

That is, the filler Q is mixed in an amount of 0.1 weight % (wt %) or more and 40 weight % (wt %) or less in the adhesive layer N. Preferably, the filler Q is mixed in an amount of 5 weight % (wt %) or less. In the present embodiment, the filler Q is mixed in an amount of 5 weight % (wt %), for example.

Titanium oxide ($TiO_2$) particles having a size of about 200 nm can be preferably used as the inorganic material serving as the filler Q, and it is more preferable that the titanium oxide ($TiO_2$) is provided with at least one of an alumina coating, a silica coating, and a zirconia coating.

Accordingly, the radiative cooling device CP is configured such that the radiative surface H of the infrared radiative layer A reflects a portion of light L incident on the radiative cooling device CP and the light reflective layer B reflects a portion (e.g., sunlight) of light L incident on the radiative cooling device CP and transmitted through the resin material layer J and the protective layer D so that the reflected light goes out from the radiative surface H to the outside.

The radiative cooling device CP is also configured to cool a cooling target E on a side of the light reflective layer B, which is the side opposite to the resin material layer J, by converting heat input from the cooling target E (e.g., heat conducted from the cooling target E) to the radiative cooling device CP to infrared light IR in the resin material layer J and radiating the infrared light IR from the resin material layer J.

That is, the radiative cooling device CP is configured to reflect light L emitted toward the radiative cooling device CP and radiate heat conducted to the radiative cooling device CP (e.g., heat conducted from the atmosphere or the cooling target E) as infrared light IR to the outside.

Also, the radiative cooling device CP (radiative cooling film) is configured to be flexible due to the resin material layer J, the protective layer D, and the light reflective layer B being flexible.

Moreover, the inorganic filler Q is mixed in the adhesive layer N, which joins the resin material layer J to the protective layer D, and accordingly, when the radiative cooling device CP is viewed from the radiative surface H side, the inorganic filler Q mixed in the adhesive layer N is visible through the transparent resin material layer J. Therefore, the radiative cooling device CP appears white when viewed from the radiative surface H side due to a light scattering effect of the inorganic filler Q, and the appearance of the radiative cooling device CP can be improved.

In addition, the radiative cooling device CP is used to perform a radiative cooling method of radiating infrared light IR from the radiative surface H opposite to a surface of the resin material layer J, which is in contact with the light reflective layer B. Specifically, the radiative cooling method is performed by directing the radiative surface H skyward to allow infrared light IR to be radiated from the radiative surface H.

[Outline of Resin Material Layer]

The absorptivity and the emissivity (light emissivity) of the resin material forming the resin material layer J vary according to the thickness of the resin material layer. Therefore, the thickness of the resin material layer J needs to be adjusted in such a manner that the resin material layer does not absorb sunlight as far as possible and radiates a large amount of heat in the wavelength band of so-called atmospheric window (light wavelength range from 8 μm to 14 μm).

Specifically, from the viewpoint of absorptivity for sunlight, the thickness of the resin material layer J needs to be adjusted in such a manner that a wavelength average absorptivity in a wavelength range from 0.4 μm to 0.5 μm is 13% or less, a wavelength average absorptivity in a wavelength range from 0.5 μm to 0.8 μm is 4% or less, a wavelength average absorptivity in a wavelength range from 0.8 μm to 1.5 μm is 1% or less, a wavelength average absorptivity in a wavelength range from 1.5 μm to 2.5 μm is 40% or less, and a wavelength average absorptivity in a wavelength range from 2.5 μm to 4 μm is 100% or less.

In the case of such an absorptivity distribution, the absorptivity for sunlight is 10% or less, which corresponds to an energy of 100 W or less.

The absorptivity of the resin material increases as the film thickness of the resin material is increased as described later. When the film thickness of the resin material is made large, the emissivity in the atmospheric window becomes approximately 1, and the amount of heat radiated toward the universe at that time is 125 $W/m^2$ to 160 $W/m^2$. The amount of sunlight absorbed by the protective layer D and the light reflective layer B is 50 $W/m^2$ or less. Cooling progresses if the sum of amounts of sunlight absorbed by the resin material layer J, the protective layer D, and the light reflective layer B is 150 $W/m^2$ or less and the atmosphere is in good conditions. It is preferable to use a resin material that has a small absorptivity in the vicinity of a peak value of the sunlight spectrum as described above as the resin material of the resin material layer J.

Also, from the viewpoint of infrared radiation (heat radiation), the thickness of the resin material layer J needs to be adjusted in such a manner that a wavelength average emissivity in the wavelength range from 8 μm to 14 μm is 40% or more.

In order to emit heat energy of about 50 $W/m^2$ absorbed from sunlight by the protective layer D and the light reflective layer B to the universe from the resin material layer J through heat radiation from the resin material layer J, the resin material layer J needs to radiate heat more than or equal to the absorbed heat.

For example, when the ambient temperature is 30° C., the maximum heat radiation in the atmospheric window of the wavelength range from 8 μm to 14 μm is 200 $W/m^2$ (calculated with the emissivity taken as 1). This value can be obtained in an environment in which the air is thin and very dry, such as an environment on a high mountain, in cloudless weather. When compared with a high mountain, the thickness of the atmosphere increases in a lowland, for example, and accordingly, the wavelength band of the atmospheric window becomes narrower and the transmittance decreases. This is said as "the atmospheric window becoming narrower".

Also, the radiative cooling device CP (radiative cooling film) is actually used in a humid environment, and the atmospheric window becomes narrower in such a case as well. When the radiative cooling device is used in a lowland, heat radiation in the atmospheric window band is estimated to be 160 $W/m^2$ (calculated with the emissivity taken as 1) at 30° C. under good conditions. Moreover, when there is haze or smog in the sky, as is often the case in Japan, the atmospheric window further becomes narrower and radiation to the universe becomes about 125 $W/m^2$.

In view of the foregoing, the radiative cooling device cannot be used in a lowland in the mid-latitude area unless the wavelength average emissivity in the wavelength range from 8 μm to 14 μm is 40% or more (heat radiation intensity in the atmospheric window band is 50 $W/m^2$ or more).

Therefore, when the thickness of the resin material layer J is adjusted so as to fall within the range of optical prescriptions defined in view of the above circumstances, the amount of heat output in the atmospheric window becomes greater than the amount of heat input through absorption of sunlight, and the temperature can be made lower than the ambient temperature through radiative cooling in an outdoor environment even under solar radiation.

[Details of Resin Material]

It is possible to use colorless resin materials that have any of a carbon-fluorine bond (C—F), a siloxane bond (Si—O—Si), a carbon-chlorine bond (C—Cl), a carbon-oxygen bond (C—O), an ester bond (R—COO—R), an ether bond (C—O—C bond), and a benzene ring. In particular, colorless resin materials that have a carbon-fluorine bond (C—F) or a carbon-chlorine bond (C—Cl) are preferably used.

Figure 2:
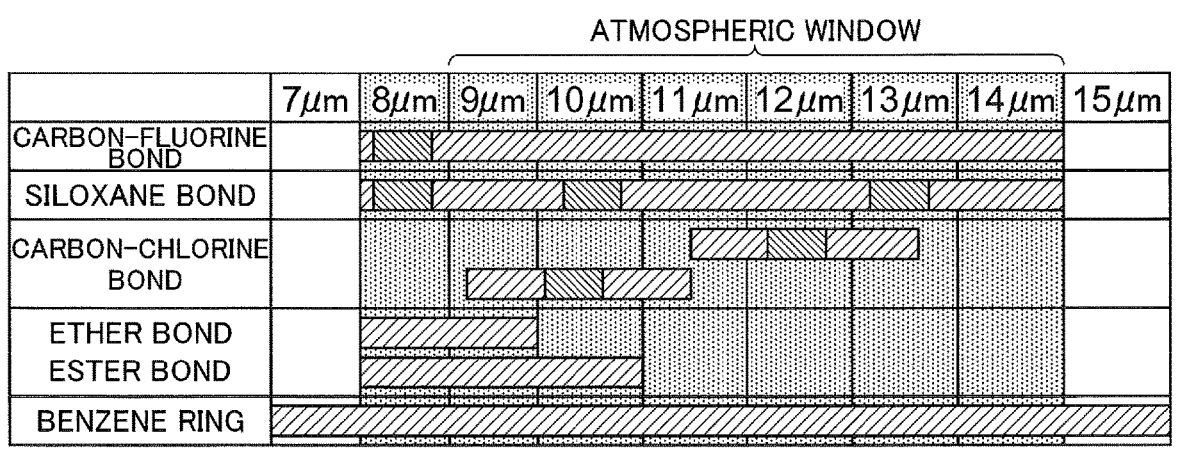
FIG. 2 is a diagram showing a relationship between absorption coefficients of resin materials and wavelength bands.

For each resin material (except for a resin material having a carbon-oxygen bond), FIG. 2 shows a wavelength range in which the resin material has an absorption coefficient in the wavelength band of the atmospheric window.

According to Kirchhoff's law, the emissivity (e) is equal to the absorptivity (A). The absorptivity can be calculated from an absorption coefficient (α) and the following expression (1) (hereinafter may be referred to as an absorptivity relational expression).

$$A = 1 \cdot \exp(\cdot \alpha t) \quad (1)$$

Note that t represents the film thickness.

That is, by adjusting the film thickness of the resin material layer J, it is possible to obtain a large amount of heat radiation in a wavelength band in which the absorption coefficient is large. In a case where radiative cooling is performed outdoors, it is preferable to use a material that has a large absorption coefficient in the wavelength band of the atmospheric window, which is from 8 μm to 14 μm.

Also, in order to suppress absorption of sunlight, it is preferable to use a material that does not have an absorption coefficient or has a small absorption coefficient in a wavelength range from 0.3 μm to 4 μm, and particularly from 0.4 μm to 2.5 μm. As can be understood from the relational expression of the absorption coefficient and the absorptivity, the absorptivity (emissivity) varies according to the film thickness of the resin material.

In order to make the temperature lower than the temperature of the surrounding atmosphere through radiative cooling under solar radiation, it is possible to create a state in which almost no sunlight is absorbed but a large amount of heat is radiated in the atmospheric window, i.e., output of radiative cooling is greater than input of sunlight, by selecting a material that has a large absorption coefficient in the wavelength band of the atmospheric window and almost no absorption coefficient in the wavelength band of sunlight and by adjusting the film thickness.

As for the carbon-fluorine bond (C—F), absorption coefficients of CHF and $CF_2$ are widely spread in the wide wavelength band from 8 μm to 14 μm, which is the atmospheric window, and an absorption coefficient at 8.6 μm is particularly large. Regarding the wavelength band of sunlight, there is no noticeable absorption coefficient in the wavelength range from 0.3 μm to 2.5 μm in which the energy intensity is high.

Examples of resin materials that have a carbon-fluorine bond (C—F) include:
polytetrafluoroethylene (PTFE), which is a fully fluorinated resin;
polychlorotrifluoroethylene (PCTFE), polyvinylidene fluoride (PVDF), and polyvinyl fluoride (PVF), which are partially fluorinated resins;
a perfluoroalkoxy fluorocarbon resin (PFA), which is a fluorinated resin copolymer;
a tetrafluoroethylene-hexafluoropropylene copolymer (FEP);
an ethylene-tetrafluoroethylene copolymer (ETFE); and
an ethylene-chlorotrifluoroethylene copolymer (ECTFE).

Examples of resin materials that have a siloxane bond (Si—O—Si) include silicone rubber and a silicone resin.

In the cases of these resins, a large absorption coefficient for stretching of C—Si bonds appears broadly around a wavelength of 13.3 μm, an absorption coefficient for out-of-plane bending (wagging) of $CSiH_2$ appears broadly around a wavelength of 10 μm, and an absorption coefficient for in-plane bending (scissoring) of $CSiH_2$ slightly appears in the vicinity of a wavelength of 8 μm.

As for the carbon-chlorine bond (C—Cl), an absorption coefficient for stretching vibration of C—Cl appears around a wavelength of 12 μm over a wide range with a half width of 1 μm or more.

Examples of resin materials that have a carbon-chlorine bond include a vinyl chloride resin (PVC) and a vinylidene chloride resin (PVDC). In the case of the vinyl chloride resin, an absorption coefficient for bending vibration of C—H in an alkene contained in the main chain appears at a wavelength of about 10 μm under the influence of electron-withdrawing of chlorine.

The ester bond (R—COO—R) and the ether bond (C—O—C bond) have absorption coefficients in a wavelength range from 7.8 μm to 9.9 μm. As for a carbon-oxygen bond included in the ester bond and the ether bond, a large absorption coefficient appears in a wavelength range from 8 μm to 10 μm.

When a benzene ring is introduced into a side chain of a hydrocarbon resin, absorption appears broadly in a wavelength range from 8.1 μm to 18 μm due to vibration of the benzene ring itself and vibration of surrounding elements under the influence of the benzene ring.

Examples of resins that have these bonds include a methyl methacrylate resin, an ethylene terephthalate resin, a trimethylene terephthalate resin, a butylene terephthalate resin, an ethylene naphthalate resin, and a butylene naphthalate resin.

As described above, various resin materials can be used as the resin material of the resin material layer J, but colorless resin materials that have a carbon-fluorine bond (C—F) or a carbon-chlorine bond (C—Cl) are preferably used. In particular, a vinyl chloride resin and a vinylidene chloride resin, which are resin materials having a carbon-chlorine bond (C—Cl), and a vinyl fluoride resin and a vinylidene fluoride resin, which are resin materials having a carbon-fluorine bond (C—F), are flame retardant and are unlikely to undergo biodegradation, and therefore can be preferably used as the resin material included in the radiative cooling device CP that is used outdoors.

The following mainly describes resin materials having a carbon-chlorine bond (C—Cl) and resin materials having a carbon-fluorine bond (C—F).

[Consideration on Light Absorption]

The following is consideration on absorption of light in the ultraviolet-visible range, i.e., absorption of sunlight by resin materials having the above-described bonds and functional group. The origin of absorption of ultraviolet light and visible light is transition of electrons that contribute to bonds. Absorption of light in this wavelength range can be found by calculating bond energy.

First, the following considers wavelengths at which resin materials having a carbon-fluorine bond (C—F) have an absorption coefficient in the ultraviolet-visible range. When the vinylidene fluoride resin (PVDF) is taken as a representative example, bond energies of a C—C bond, a C—H bond, and a C—F bond in the basic structural unit are 4.50 eV, 4.46 eV, and 5.05 eV. These energies correspond to a wavelength of 0.275 µm, a wavelength of 0.278 µm, and a wavelength of 0.246 µm, respectively, and the resin absorbs light having these wavelengths.

Since the sunlight spectrum includes only wavelengths longer than or equal to 0.295 µm, when a fluorocarbon resin is used, the resin absorbs almost no ultraviolet rays, visible rays, and near-infrared rays of sunlight. Note that ultraviolet rays are defined as light having a wavelength shorter than 0.400 µm, visible rays are defined as light in a wavelength range from 0.400 µm to 0.800 µm, near-infrared rays are defined as light in a wavelength range from 0.800 µm to 3 µm, mid-infrared rays are defined as light in a wavelength range from 3 µm to 8 µm, and far-infrared rays are defined as light having a wavelength longer than 8 µm.

Figure 3:
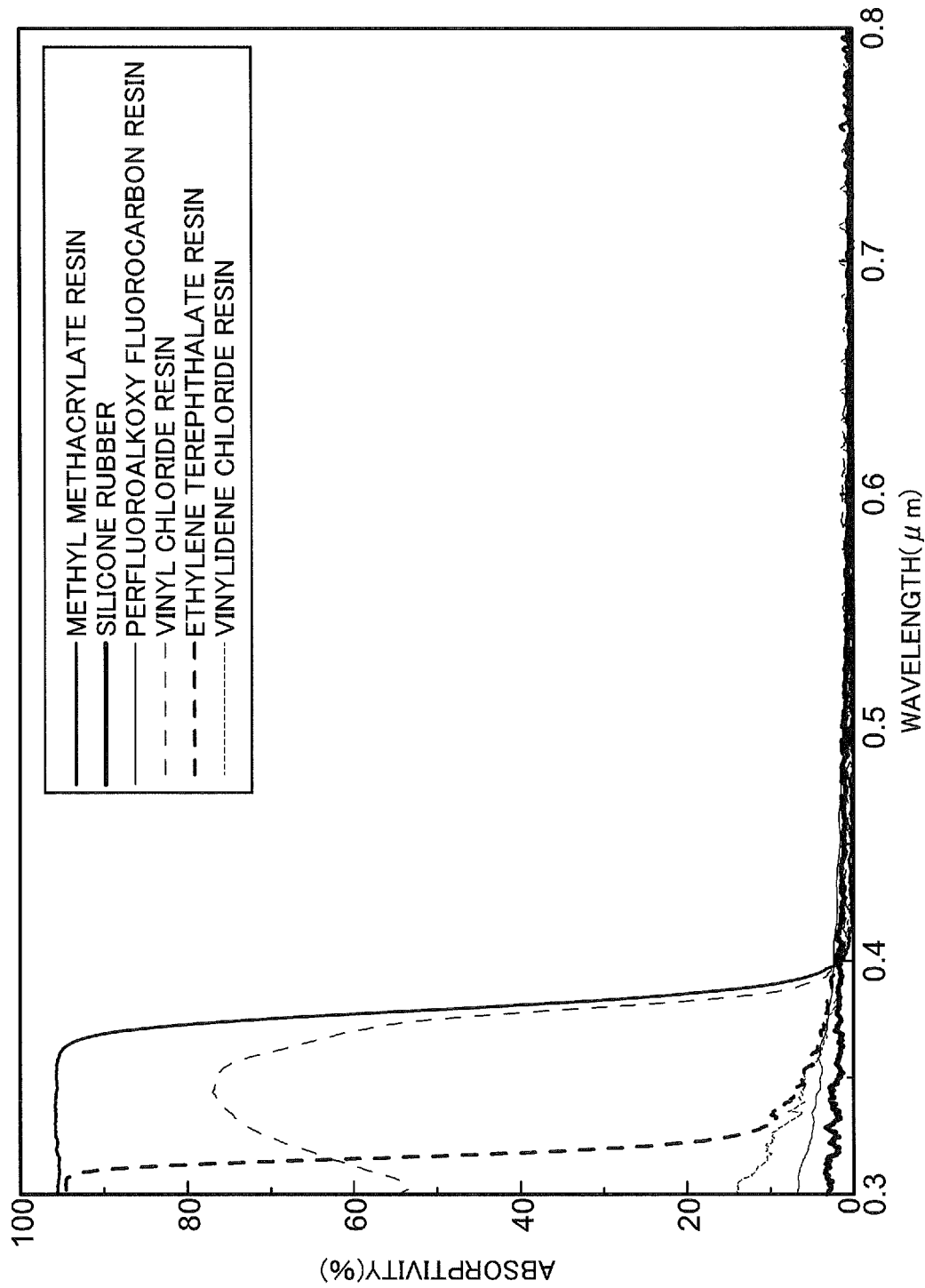
FIG. 3 is a diagram showing a relationship between absorptivities of resin materials and the wavelength.

FIG. 3 shows an absorptivity spectrum of PFA (perfluoroalkoxy fluorocarbon resin) with a thickness of 50 µm as a representative resin material having a carbon-fluorine bond (C—F) in the ultraviolet-visible range. It can be found that PFA has almost no absorptivity in this range. Although a slight increase can be observed in the absorptivity spectrum at wavelengths shorter than 0.4 µm, this increase shows an influence of scattering in the sample used for the measurement, and the absorptivity does not actually increase.

As for the carbon-chlorine bond (C—Cl), bond energy between carbon and chlorine in an alkene is 3.28 eV, which corresponds to a wavelength of 0.378 µm, and therefore, ultraviolet rays in sunlight are absorbed well, but almost no light in the visible range is absorbed.

FIG. 3 shows an absorptivity spectrum of a vinyl chloride resin with a thickness of 100 µm in the ultraviolet-visible range. Light absorption is large at wavelengths shorter than 0.38 µm.

FIG. 3 shows an absorptivity spectrum of a vinylidene chloride resin with a thickness of 100 µm in the ultraviolet-visible range. A slight increase can be observed in the absorptivity spectrum at wavelengths shorter than 0.4 µm.

FIG. 3 also shows an absorptivity spectrum of a methyl methacrylate resin with a thickness of 5 mm in the ultraviolet-visible range. Note that the methyl methacrylate resin described as an example is a commercially available resin in which a benzotriazole ultraviolet absorbing agent is mixed.

Since the thickness is as large as 5 mm, the absorptivity is large even at wavelengths at which the absorption coefficient is small, and light absorption is large at wavelengths shorter than 0.38 µm, which is longer than 0.315 µm.

FIG. 3 also shows an absorptivity spectrum of silicone rubber with a thickness of 100 µm in the ultraviolet-visible range. It can be found that silicone rubber has almost no absorptivity in this range. Although a slight increase can be observed in the absorptivity spectrum at wavelengths shorter than 0.4 µm, this increase shows an influence of scattering in the sample used for the measurement, and the absorptivity does not actually increase.

FIG. 3 also shows an absorptivity spectrum of an ethylene terephthalate resin with a thickness of 40 µm in the ultraviolet-visible range. As shown in FIG. 3, the absorptivity increases as the wavelength gets closer to 0.315 µm, and the absorptivity sharply increases at the wavelength of 0.315 µm. In the case of the ethylene terephthalate resin as well, when the thickness is increased, the absorptivity becomes large at a wavelength slightly longer than 0.315 µm due to an absorption edge of a C—C bond, and the absorptivity for ultraviolet rays becomes large as is the case with the commercially available methyl methacrylate resin.

[Consideration on Emissivity]

The following describes the emissivity of the resin material layer J, taking resin materials having a carbon-fluorine bond and resin materials having a carbon-chlorine bond as representative examples.

Figure 6:
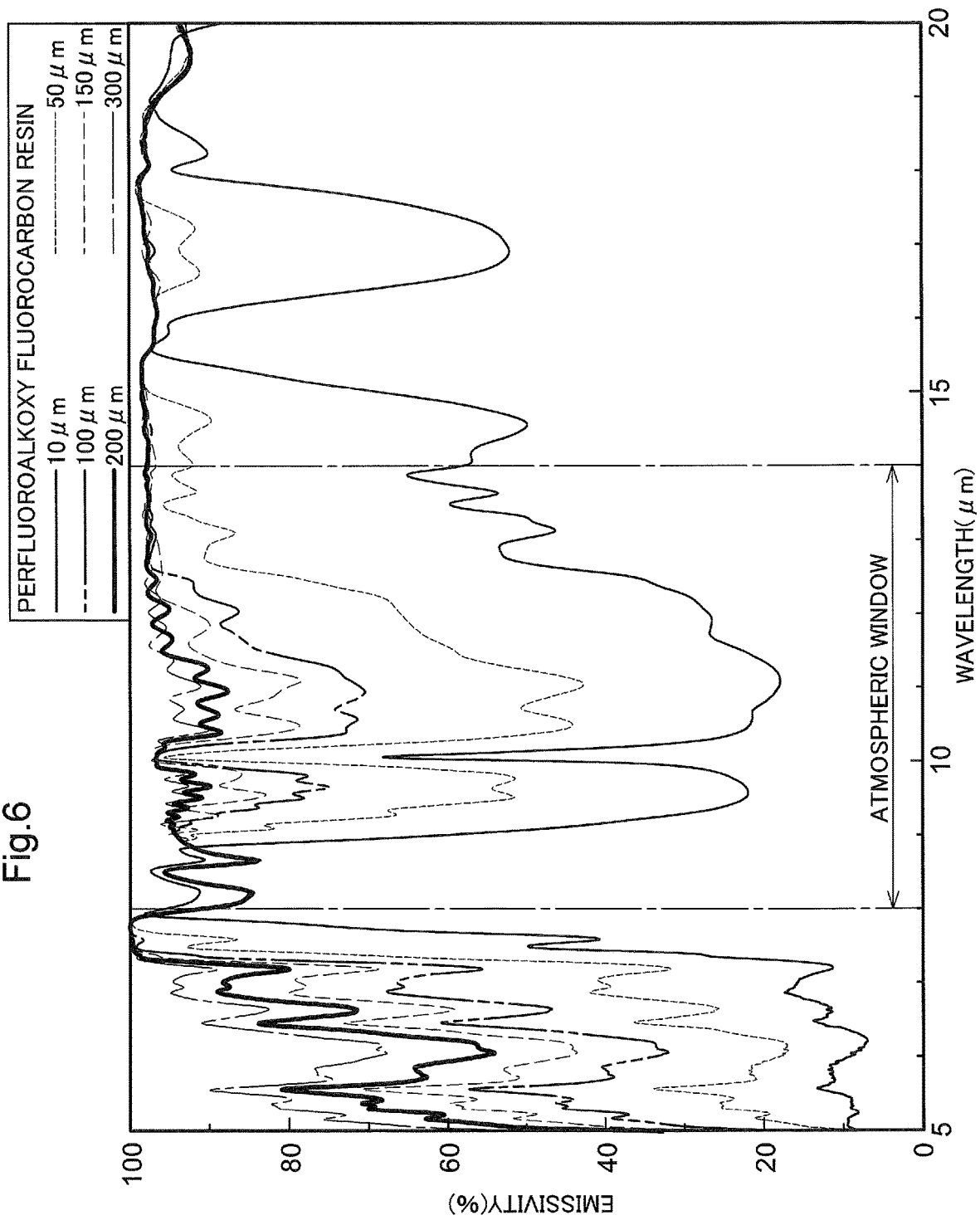
FIG. 6 is a diagram showing an emissivity spectrum of a perfluoroalkoxy fluorocarbon resin.

FIG. 6 shows the emissivity of a perfluoroalkoxy fluorocarbon resin (PFA), which is a representative example of resin materials having a carbon-fluorine bond, in the atmospheric window. Absorption coefficients of CHF and $CF_2$ are widely spread in the wide wavelength band from 8 µm to 14 µm, which is the atmospheric window, and an absorption coefficient at 8.6 µm is particularly large.

Under the influence of this, a wavelength average emissivity when the thickness is 10 µm is 45% in the wavelength range from 8 µm to 14 µm and falls within the prescribed range of the wavelength average emissivity of 40% or more. As shown in FIG. 6, the emissivity in the atmospheric window range increases as the film thickness is increased.

Figure 4:
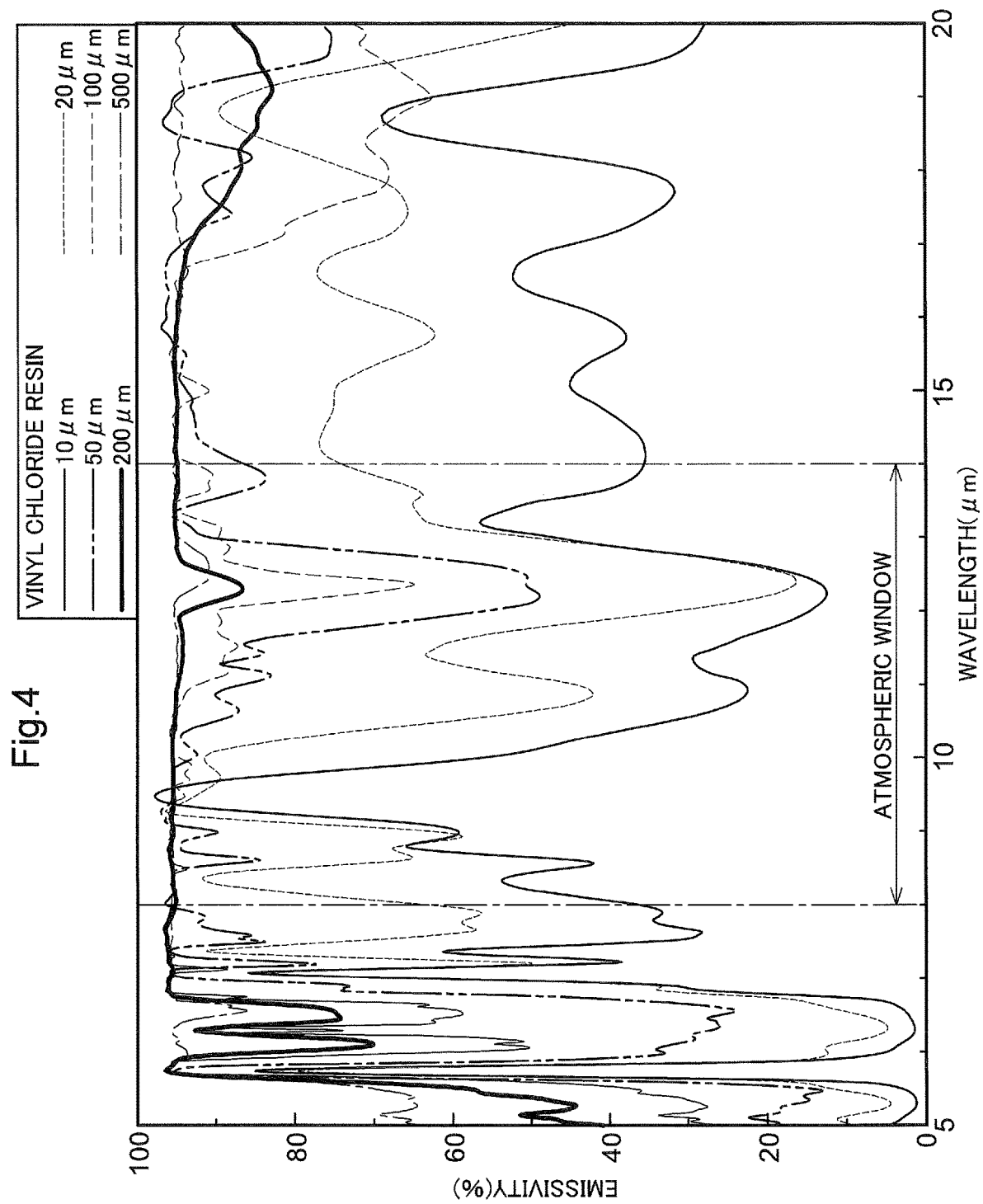
FIG. 4 is a diagram showing an emissivity spectrum of a vinyl chloride resin.
Figure 5:
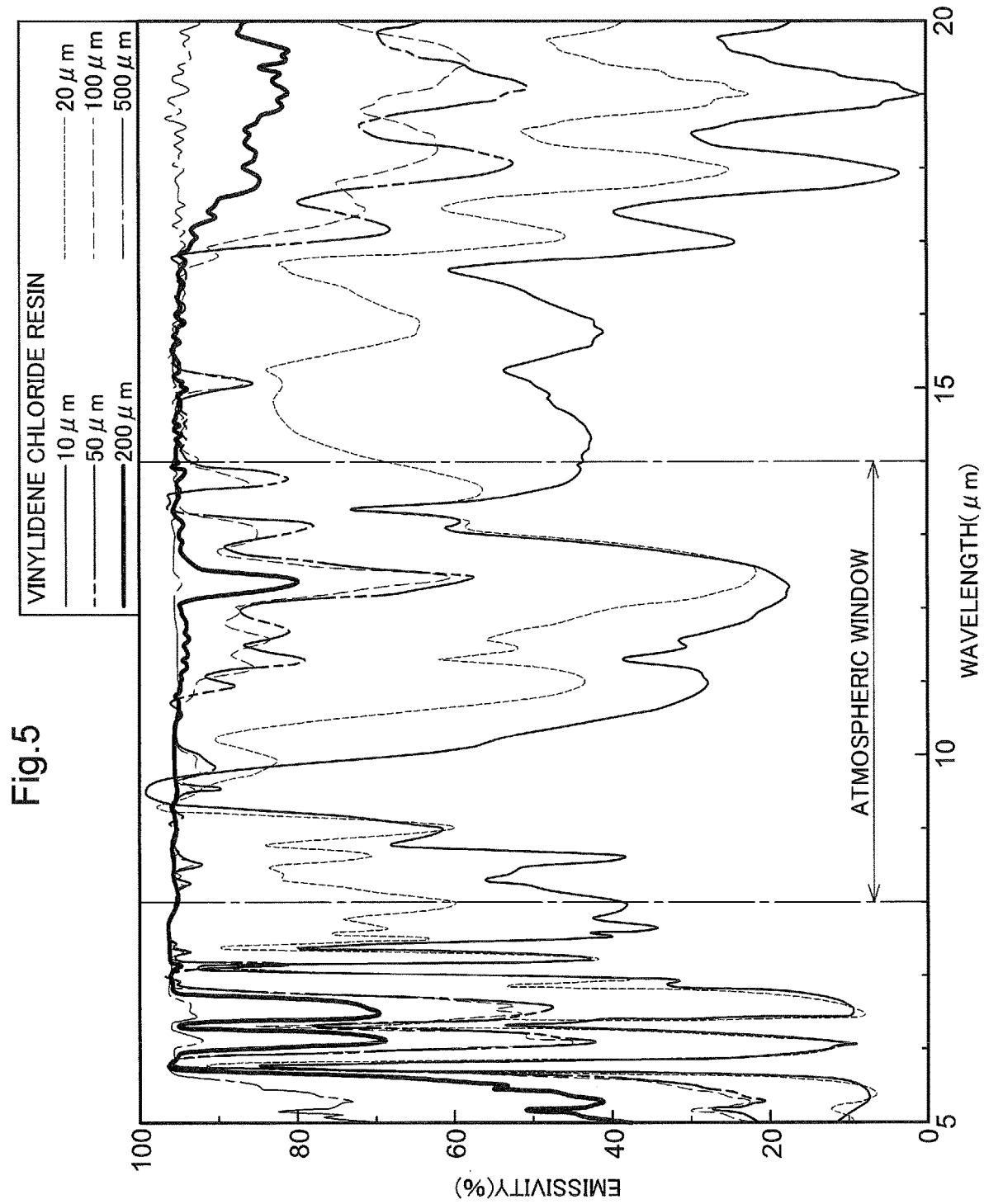
FIG. 5 is a diagram showing an emissivity spectrum of a vinylidene chloride resin.

FIG. 4 shows the emissivity of a vinyl chloride resin (PVC), which is a resin material having a carbon-chlorine bond, in the atmospheric window. Also, FIG. 5 shows the emissivity of a vinylidene chloride resin (PVDC) in the atmospheric window.

As for the carbon-chlorine bond, an absorption coefficient for stretching vibration of C—Cl appears around a wavelength of 12 µm over a wide range with a half width of 1 µm or more.

Also, in the case of the vinyl chloride resin, an absorption coefficient for bending vibration of C—H in an alkene contained in the main chain appears at a wavelength of about 10 µm under the influence of electron-withdrawing of chlorine.

Under the influence of these, a wavelength average emissivity when the thickness is 10 µm is 43% in the wavelength range from 8 µm to 14 µm and falls within the prescribed range of the wavelength average emissivity of 40% or more. As shown in FIGS. 4 and 5, the emissivity in the atmospheric window range increases as the film thickness is increased.

[Surface Temperatures of Light Reflective Layer and Resin Material Layer]

Heat radiation in the atmospheric window from the resin material layer J occurs in the vicinity of the surface of the resin material.

As shown in FIG. 6, in the case of the fluorocarbon resin, the amount of heat radiation in the atmospheric window range hardly increases even when the film thickness is increased to more than 100 µm. That is, in the case of the fluorocarbon resin, heat radiation in the atmospheric window occurs in a portion of the resin material that is within a depth of about 100 µm from the surface, and radiation from a deeper portion does not go to the outside.

As shown in FIG. 4, in the case of the vinyl chloride resin, the amount of heat radiation in the atmospheric window range hardly increases even when the film thickness is increased to more than 100 µm. That is, in the case of the vinyl chloride resin, heat radiation in the atmospheric window occurs in a portion of the resin material that is within a depth of about 100 µm from the surface, and radiation from a deeper portion does not go to the outside.

FIG. 5 shows that the matter described for the vinyl chloride resin also applies to the vinylidene chloride resin.

As described above, heat radiation from a surface of a resin material in the atmospheric window range occurs in a portion of the resin material that is within a depth of about 100 μm from the surface, and when the thickness of the resin material is increased to more than 100 μm, cold heat obtained through radiative cooling performed by the radiative cooling device CP is insulated by a portion of the resin material that does not contribute to heat radiation.

Assume a case where an ideal resin material layer J that does not absorb sunlight at all is formed on the light reflective layer B. In this case, sunlight is only absorbed by the light reflective layer B of the radiative cooling device CP.

Resin materials generally have a thermal conductivity of about 0.2 W/m/K, and when a calculation is performed taking the thermal conductivity into account, the temperature of a cooling surface (a surface of the light reflective layer B, which is opposite to the resin material layer J) increases when the thickness of the resin material layer J is larger than 20 mm.

Even if there is an ideal resin material that does not absorb sunlight at all, the thermal conductivity of a resin material is generally about 0.2 W/m/K, and accordingly, when the thickness of the resin material layer is larger than 20 mm, the light reflective layer B is heated by solar radiation and the cooling target E on the light reflective layer side is heated. That is, the thickness of the resin material in the radiative cooling device CP needs to be 20 mm or less.

[Thickness of Resin Material Layer]

From the viewpoint of practical use of the radiative cooling device CP, the thinner the resin material layer J, the better. The thermal conductivity of a resin material is generally lower than those of metal, glass, and the like. In order to effectively cool the cooling target E, it is preferable that the resin material layer J has the minimum required thickness. Heat radiation in the atmospheric window increases as the film thickness of the resin material layer J is increased, and heat radiation energy in the atmospheric window is saturated when the film thickness exceeds a certain thickness.

Although the film thickness at which heat radiation energy is saturated varies according to the resin material, in the case of a fluorocarbon resin, heat radiation energy is generally sufficiently saturated when the film thickness is 300 μm. Therefore, from the viewpoint of thermal conductivity, it is desirable to set the film thickness to be no greater than 300 μm. Furthermore, even when the thickness is about 100 μm, sufficient heat radiation can be obtained in the atmospheric window range although heat radiation is not saturated. The smaller the thickness is, the higher the thermal transmittance becomes and the more effectively the temperature of the cooling target can be reduced, and therefore, in the case of a fluorocarbon resin, the thickness is preferably set to about 100 μm or less.

In the case of a resin having a carbon-chlorine bond, heat radiation energy is saturated even when the thickness is 100 μm, and sufficient heat radiation can be obtained in the atmospheric window range even when the thickness is 50 μm. The smaller the thickness of the resin material is, the higher the thermal transmittance becomes and the more effectively the temperature of the cooling target can be reduced, and therefore, in the case of a resin having a carbon-chlorine bond, it is possible to suppress thermal insulation properties and effectively cool the cooling target E by setting the thickness to 50 μm or less. In the case of a resin having a carbon-chlorine bond, it is possible to effectively cool the cooling target E when the thickness is 100 μm or less.

When the thickness is reduced, it is possible to obtain an effect other than the effect of suppressing thermal insulation properties and facilitating conduction of cold heat. That is, it is possible to suppress light absorption by CH, $CH_2$, and $CH_3$ in the near-infrared range, which occurs in the case of a resin having a carbon-chlorine bond. When the thickness is reduced, absorption of sunlight by these can be suppressed and consequently, cooling capability of the radiative cooling device CP is increased.

From the viewpoint described above, in the case of a vinyl chloride resin, which is a resin having a carbon-chlorine bond, the radiative cooling effect can be more effectively exhibited under solar radiation when the thickness is 50 μm or less.

[Details of Light Reflective Layer]

In order to make the light reflective layer B have the reflectance characteristics described above, silver or a silver alloy needs to be used as a reflective material on the radiative surface H side (the resin material layer J side).

Figure 7:
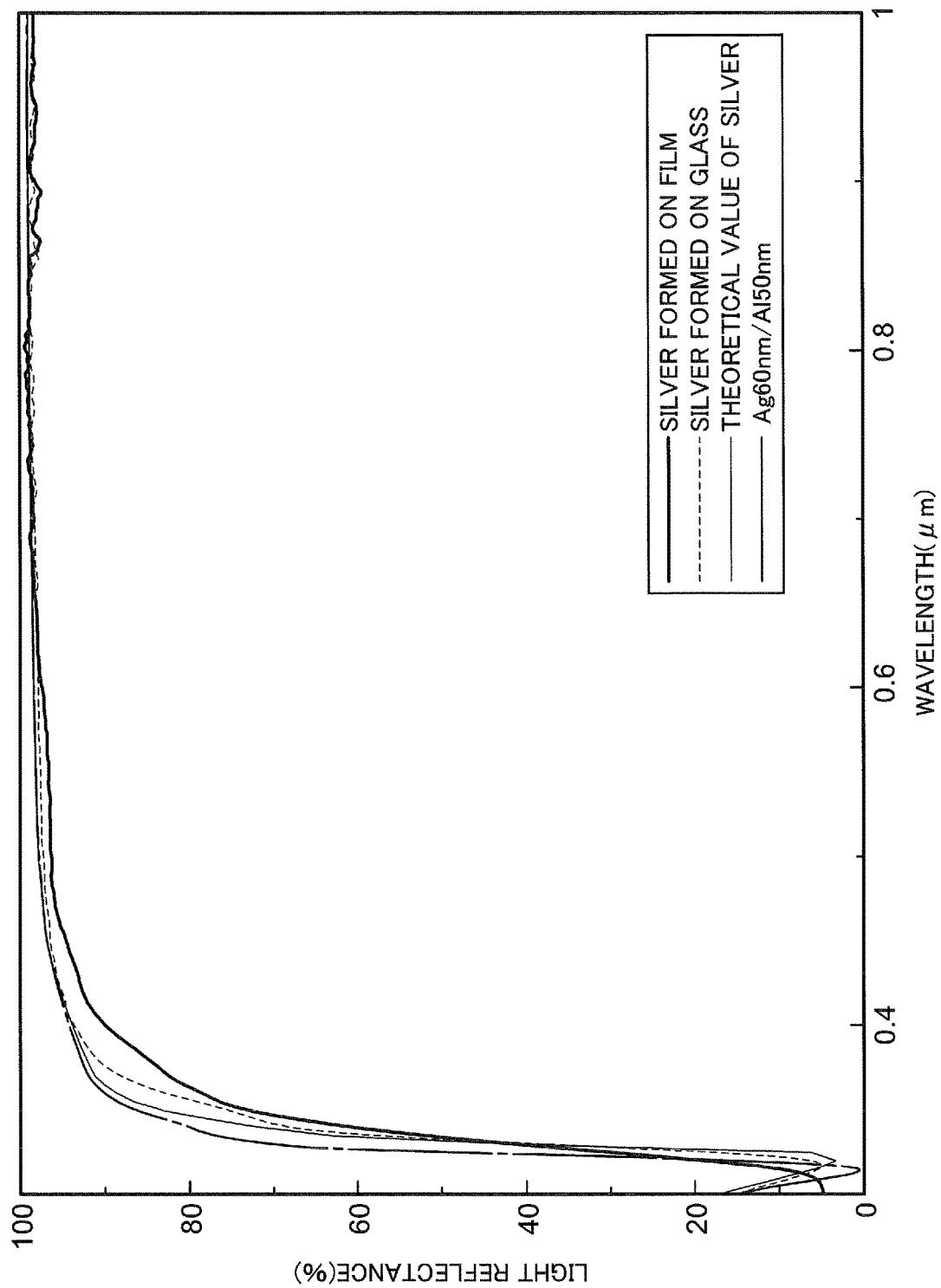
FIG. 7 is a diagram showing a reflectance spectrum of a light reflective layer that contains silver as a base material.

As shown in FIG. 7, when silver is used as a base material of the light reflective layer B, the light reflective layer B can have the required reflectance.

In a case where sunlight is to be reflected only by silver or a silver alloy in such a manner as to satisfy the reflectance characteristics described above, a thickness of 50 nm or more is required.

However, in order to make the light reflective layer B flexible, the thickness needs to be 100 μm or less. If the thickness is larger than 100 μm, the light reflective layer becomes difficult to bend.

It is possible to use, as a silver alloy, an alloy obtained by adding copper, palladium, gold, zinc, tin, magnesium, nickel, or titanium in an amount of about 0.4 mass % to 4.5 mass % to silver, for example. As a specific example, it is possible to use "APC-TR (manufactured by Furuya Metal Co., Ltd.)", which is a silver alloy manufactured by adding copper and palladium to silver.

In order to make the light reflective layer B have the reflectance characteristics described above, it is also possible to adopt a layered structure including (i) silver or a silver alloy adjacent to the protective layer D and (ii) aluminum or an aluminum alloy apart from the protective layer D. In this case as well, it is necessary to use silver or a silver alloy as the reflective material on the radiative surface H side (the resin material layer J side).

In the case where the light reflective layer is constituted by two layers made of silver (silver alloy) and aluminum (aluminum alloy), the thickness of the silver layer needs to be 10 nm or more and the thickness of the aluminum layer needs to be 30 nm or more.

However, in order to make the light reflective layer B flexible, the sum of the thickness of the silver layer and the thickness of the aluminum layer needs to be 100 μm or less. If the sum is larger than 100 μm, the light reflective layer becomes difficult to bend.

It is possible to use, as an aluminum alloy, an alloy obtained by adding copper, manganese, silicon, magnesium, zinc, carbon steel for mechanical structures, yttrium, lanthanum, gadolinium, or terbium to aluminum.

Silver and a silver alloy are weak to rain and moisture and need to be protected from them. Also, discoloration of silver and a silver alloy needs to be suppressed. Therefore, the protective layer D that protects silver needs to be adjacent to silver or a silver alloy.

Details of the protective layer D will be described later.

[Specific Configuration of Radiative Cooling Device]

Figure 8:
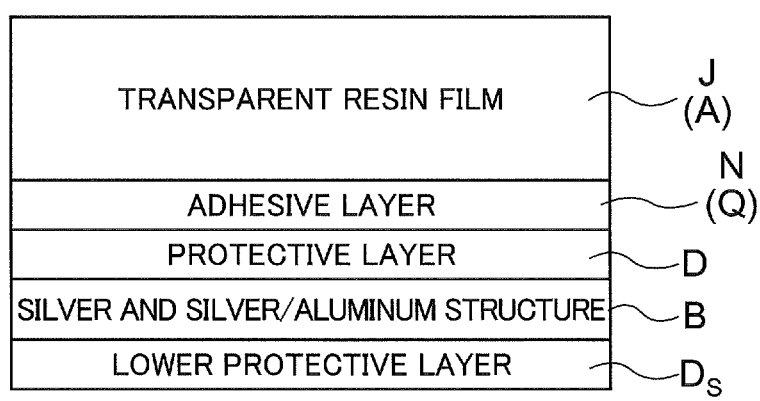
FIG. 8 is a diagram showing a specific configuration of the radiative cooling device.
Figure 9:
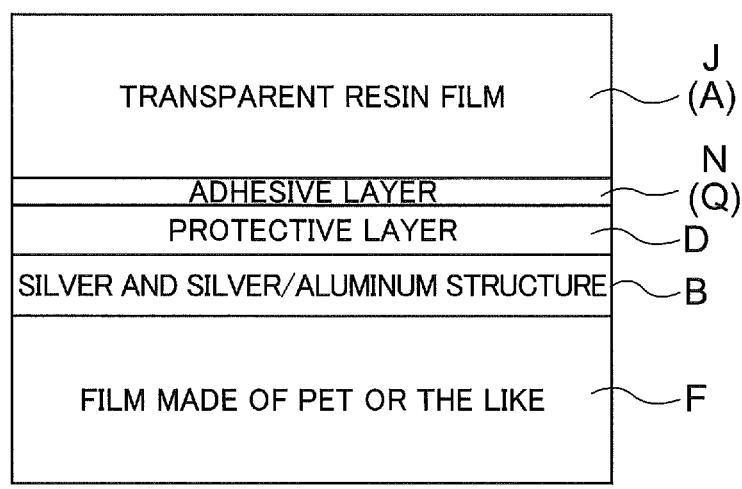
FIG. 9 is a diagram showing a specific configuration of the radiative cooling device.

As shown in FIGS. 8 and 9, the radiative cooling device CP according to the present invention can be made so as to have a film structure. Resin materials forming the resin material layer J and the protective layer D are flexible, and accordingly, when the light reflective layer B is formed as a thin film, the light reflective layer B can be made flexible as well, and consequently the radiative cooling device CP can be made as a flexible film (radiative cooling film).

The film-shaped radiative cooling device CP (radiative cooling film) can be wrapped around an outer circumferential surface of an automobile, an external wall of a warehouse or a building, or an outer circumferential surface of a helmet with use of an adhesive, for example. Thus, it is possible to easily make the radiative cooling device CP exhibit its radiative cooling capability through post attachment of the radiative cooling device CP to an existing object.

The film-shaped radiative cooling device CP (radiative cooling film) can be attached to various objects that need to be cooled, such as outer surfaces of various tents, an outer surface of a box for housing electrical equipment or the like, an outer surface of a container used for goods transportation, an outer surface of a milk tank for storing milk, and an outer surface of a milk storage portion of a milk tank lorry.

Various forms are conceivable to make the radiative cooling device CP in the form of a film. For example, it is conceivable to apply the protective layer D to the light reflective layer B formed in a film shape, and join the resin material layer J to the protective layer D with use of the adhesive layer N. Alternatively, it is conceivable to attach the protective layer D to the light reflective layer B formed in a film shape, and join the resin material layer J to the protective layer D with use of the adhesive layer N. Alternatively, it is conceivable to join the protective layer D to the resin material layer J formed in a film shape with use of the adhesive layer N, and form the light reflective layer B on the protective layer D through vapor deposition, sputtering, ion plating, a silver mirror reaction, or the like.

More specifically, a radiative cooling device CP (radiative cooling film) shown in FIG. 8 is obtained by forming the protective layer D on the upper side of the light reflective layer B, and forming the resin material layer J on the protective layer D in a case where the light reflective layer B is constituted by a single layer of silver or a silver alloy or two layers respectively made of silver (silver alloy) and aluminum (aluminum alloy). Note that a lower protective layer Ds made of an alkaline resin is also formed on the lower side of the light reflective layer B.

As a method for producing the radiative cooling device CP (radiative cooling film) shown in FIG. 8, it is possible to use a method of joining (attaching) the protective layer D, which has been separately formed, to the film-shaped resin material layer J with use of the adhesive layer N, and applying the light reflective layer B and the lower protective layer Ds in this order on the protective layer D to form these layers into a single piece.

A radiative cooling device CP (radiative cooling film) shown in FIG. 9 is obtained by forming the protective layer D on the upper side of the light reflective layer B, forming the resin material layer J on the protective layer D, and forming a film layer F made of PET or the like on the lower side of the light reflective layer B in a case where the light reflective layer B is constituted by a single layer made of silver or a silver alloy or two layers respectively made of silver (silver alloy) and aluminum (aluminum alloy).

As a method for producing the radiative cooling device CP (radiative cooling film) shown in FIG. 9, it is possible to use a method of applying the light reflective layer B and the protective layer D in this order on the film layer F (corresponding to a substrate) formed in a film shape from PET (ethylene terephthalate resin) or the like to form these layers into a single piece, and joining (attaching) the resin material layer J, which has been separately formed, to the protective layer D with use of the adhesive layer N.

Examples of adhesive agents (pressure-sensitive adhesive agents) that can be used for the adhesive layer N include a urethane adhesive agent (pressure-sensitive adhesive agent), an acrylic adhesive agent (pressure-sensitive adhesive agent), and an EVA (ethylene vinyl acetate) adhesive agent (pressure-sensitive adhesive agent), and it is desirable to use an adhesive agent (pressure-sensitive adhesive agent) that is highly transparent to sunlight.

[Details of Protective Layer]

The protective layer D is formed from a polyolefin resin with a thickness of 300 nm or more and 40 μm or less or polyethylene terephthalate with a thickness of 17 μm or more and 40 μm or less.

Examples of the polyolefin resin include polyethylene and polypropylene.

Figure 10:
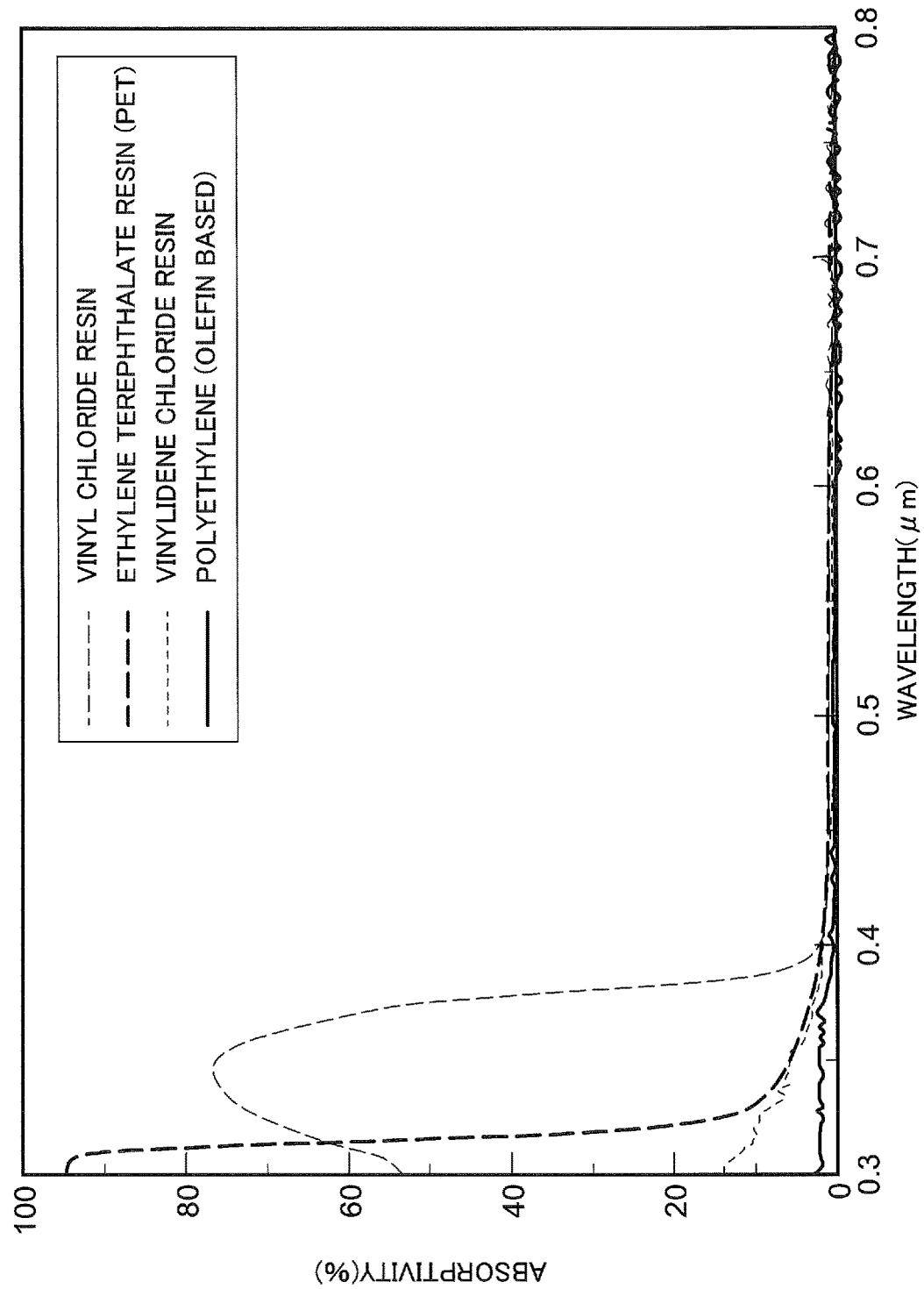
FIG. 10 is a diagram showing a relationship between the absorptivity of polyethylene and the wavelength.

FIG. 10 shows absorptivities of polyethylene, a vinylidene chloride resin, an ethylene terephthalate resin, and a vinyl chloride resin for ultraviolet rays.

Figure 11:
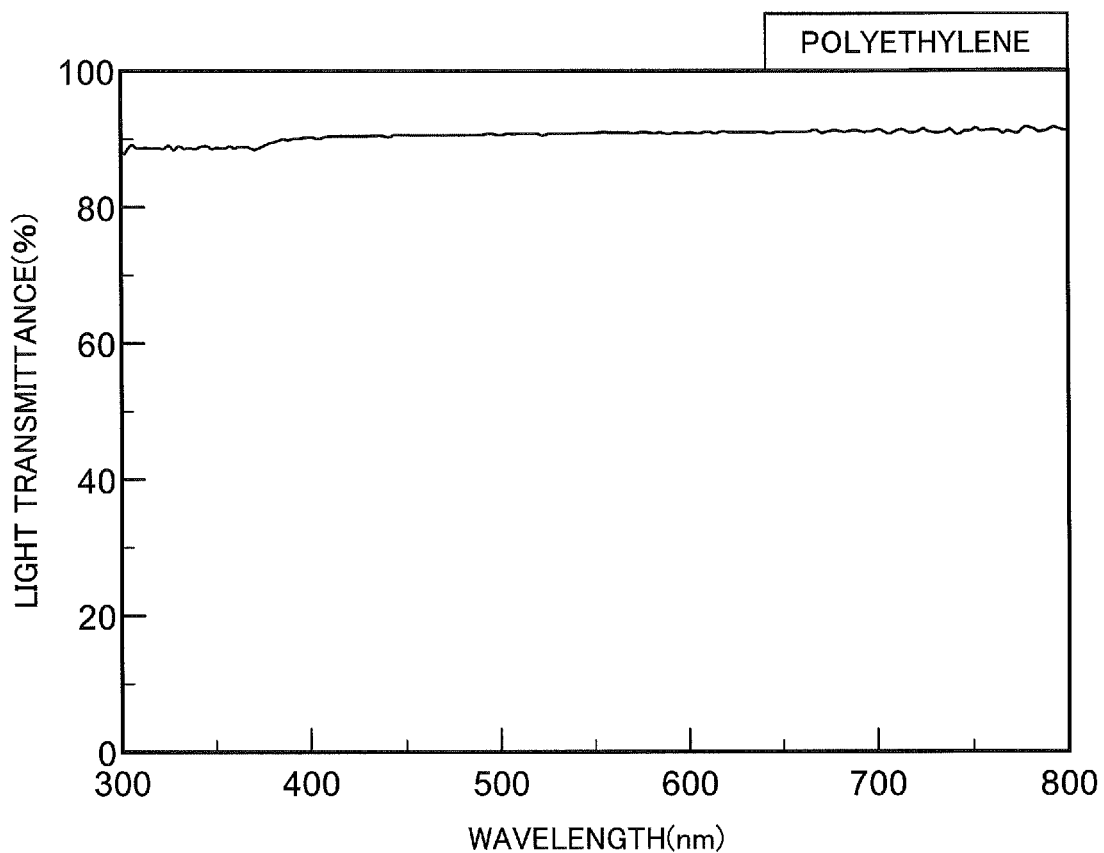
FIG. 11 is a diagram showing a relationship between the light transmittance of polyethylene and the wavelength.

FIG. 11 shows a light transmittance of polyethylene, which is preferably used as a synthetic resin to form the protective layer D.

The radiative cooling device CP (radiative cooling film) exhibits a radiative cooling effect not only at night but also under solar radiation. Accordingly, in order to maintain the state where the light reflective layer B exhibits its light reflecting function, it is necessary to prevent discoloration of silver constituting the light reflective layer B under solar radiation by protecting the light reflective layer B with the protective layer D.

In the case where the protective layer D is formed from a polyolefin resin with a thickness of 300 nm or more and 40 μm or less, the protective layer D is unlikely to deteriorate by absorbing ultraviolet rays because the polyolefin resin is a synthetic resin that has an absorptivity of 10% or less for ultraviolet rays over the entire wavelength range of ultraviolet rays from 0.3 μm to 0.4 μm.

Moreover, since the thickness of the polyolefin resin forming the protective layer D is 300 nm or more, the protective layer D favorably exhibits a blocking function of blocking radicals generated in the resin material layer J to keep the radicals from reaching silver or a silver alloy included in the light reflective layer B and blocking moisture that has permeated through the resin material layer J to keep the moisture from reaching silver or a silver alloy included in the light reflective layer B, and thus discoloration of silver or a silver alloy included in the light reflective layer B can be suppressed.

When ultraviolet rays are absorbed by the protective layer D formed from the polyolefin resin, the protective layer D deteriorates while forming radicals on the side of its surface apart from the light reflective layer B, but the generated radicals do not reach the light reflective layer because the protective layer D has a thickness of 300 nm or more. Also, although the protective layer D deteriorates while forming radicals, the progress of deterioration is slow because absorption of ultraviolet rays is low, and therefore, the protective layer D exhibits the above-described blocking function for a long period of time.

In the case where the protective layer D is formed from an ethylene terephthalate resin with a thickness of 17 μm or more and 40 μm or less, the ethylene terephthalate resin is a synthetic resin that has a higher absorptivity for ultraviolet rays than the polyolefin resin in the wavelength range of ultraviolet rays from 0.3 μm to 0.4 μm. However, the protective layer has a thickness of 17 μm or more, and therefore, the protective layer D favorably exhibits the blocking function of blocking radicals generated in the resin material layer J to keep the radicals from reaching silver or a silver alloy included in the light reflective layer B and blocking moisture that has permeated through the resin material layer J to keep the moisture from reaching silver or a silver alloy included in the light reflective layer B for a long period of time, and thus discoloration of silver or a silver alloy included in the light reflective layer B can be suppressed.

That is, the protective layer formed from the ethylene terephthalate resin deteriorates by absorbing ultraviolet rays while forming radicals on the side of its surface apart from the light reflective layer B, but the generated radicals do not reach the light reflective layer because the protective layer D has a thickness of 17 µm or more. Also, although the protective layer D deteriorates while forming radicals, the protective layer D has a thickness of 17 µm or more, and accordingly, exhibits the above-described blocking function for a long period of time.

When described in more detail, the ethylene terephthalate resin (PET) deteriorates as a result of ester bonds of ethylene glycol and terephthalic acid being cleaved by ultraviolet rays and radicals being formed. This deterioration progresses sequentially from the surface of the ethylene terephthalate resin (PET) irradiated with ultraviolet rays.

For example, when the ethylene terephthalate resin (PET) is irradiated with ultraviolet rays with an intensity equivalent to that in Osaka, ester bonds of the ethylene terephthalate resin (PET) are cleaved sequentially from the irradiated surface by a depth of about 9 nm per day. The ethylene terephthalate resin (PET) has been sufficiently polymerized, and therefore, a surface portion of the ethylene terephthalate resin (PET) where the cleavage has occurred does not damage silver (silver alloy) included in the light reflective layer B, but when a cleaved end of the ethylene terephthalate resin (PET) reaches the silver (silver alloy) included in the light reflective layer B, the silver (silver alloy) is discolored.

Therefore, in order to make the protective layer D durable for a year or longer when used outdoors, the protective layer needs to have a thickness of about 3 µm, which is calculated by adding up 9 nm/day for 365 days. In order to make the protective layer D formed from the ethylene terephthalate resin (PET) durable for three years or longer, the protective layer needs to have a thickness of 10 µm or more. In order to make the protective layer D durable for five years or longer, the protective layer needs to have a thickness of 17 µm or more.

Note that the upper limit value of the thickness of the protective layer D is set for the cases where the protective layer D is formed from the polyolefin resin or the ethylene terephthalate resin in order to avoid a situation in which the protective layer D exhibits thermal insulation properties, which do not contribute to radiative cooling. That is, as the thickness of the protective layer D is increased, the protective layer D exhibits thermal insulation properties, which do not contribute to radiative cooling, and therefore, the upper limit value of the thickness is set to prevent the protective layer D from exhibiting thermal insulation properties, which do not contribute to radiative cooling, while allowing the protective layer D to exhibit the function of protecting the light reflective layer B.

In the case where the radiative cooling device includes the adhesive layer N between the resin material layer J and the protective layer D, radicals are generated from the adhesive layer N as well, but it is possible to keep the radicals generated in the adhesive layer N from reaching the light reflective layer B for a long period of time when the thickness of the polyolefin resin forming the protective layer D is 300 nm or more or the thickness of the ethylene terephthalate resin forming the protective layer D is 17 µm or more.

Note that, when the thickness of the protective layer D is increased, there is no demerit in preventing coloration of silver (silver alloy) included in the light reflective layer B, but there arises a problem in radiative cooling as described above. That is, thermal insulation properties of a radiative cooling material are enhanced when the thickness is increased.

For example, in the case of a resin that contains polyethylene as a main component, which is an excellent synthetic resin for forming the protective layer D, the emissivity in the atmospheric window is small, and therefore, even if the thickness is increased, the increase does not contribute to radiative cooling. Conversely, thermal insulation properties of the radiative cooling material are enhanced when the thickness is increased. Next, when the thickness is increased, absorption through vibration of the main chain increases in the near-infrared range, and an effect of increasing absorption of sunlight increases.

For these reasons, a protective layer D having a large thickness is disadvantageous in radiative cooling. From the viewpoints described above, the thickness of the protective layer D formed from the polyolefin resin is preferably 5 µm or less, and more preferably 1 µm or less.

[Consideration on Protective Layer]

Figure 12:
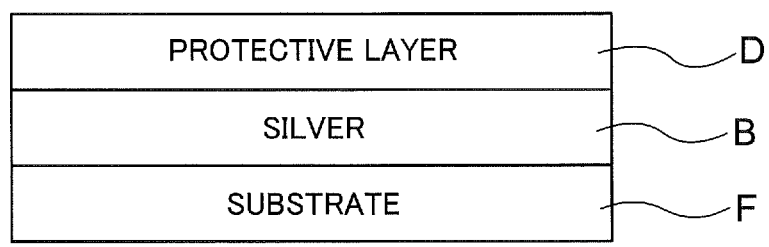
FIG. 12 is a diagram showing a configuration for a test.

In order to examine a difference in coloration of silver according to the protective layer D, samples that did not include the resin material layer J as the infrared radiative layer A and in which the protective layer D was exposed were produced as shown in FIG. 12 and coloration of silver after the samples were irradiated with simulated sunlight was examined.

That is, two types of resins, one of which being a common acrylic resin that absorbs ultraviolet rays (e.g., a methyl methacrylate resin in which a benzotriazole ultraviolet absorbing agent is mixed) and the other being polyethylene, were each applied as the protective layer D to a film layer F (corresponding to a substrate) provided with silver that served as the light reflective layer B, with use of a bar coater to form the samples, and functions of the resins as the protective layer D were examined. Thicknesses of the applied protective layers D were 10 µm and 1 µm, respectively.

Note that the film layer F (corresponding to a substrate) was formed in a film shape from PET (ethylene terephthalate resin) or the like.

Figure 14:
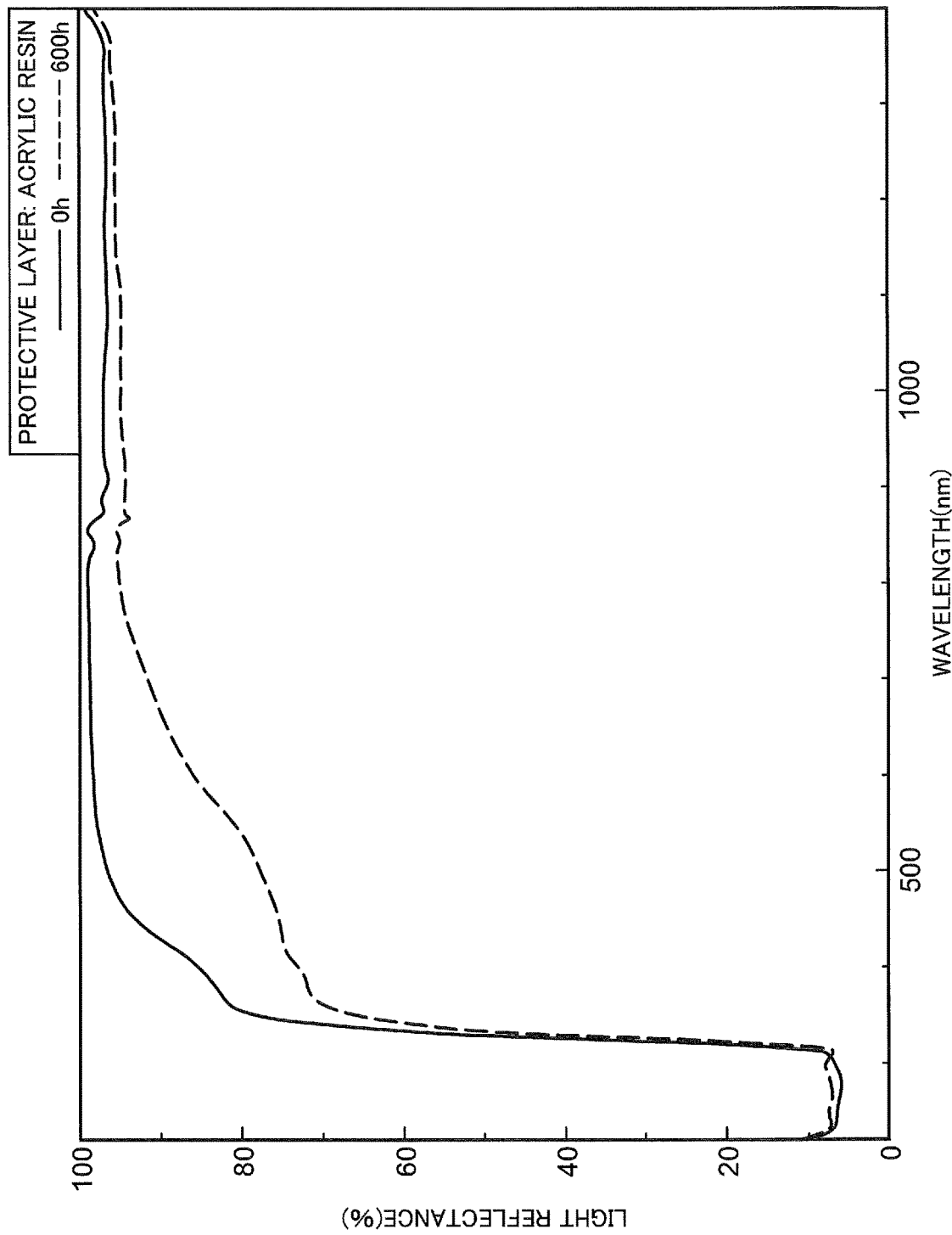
FIG. 14 is a diagram showing a test result of a case where a protective layer was made of an ultraviolet absorbing acrylic resin.
Figure 15:
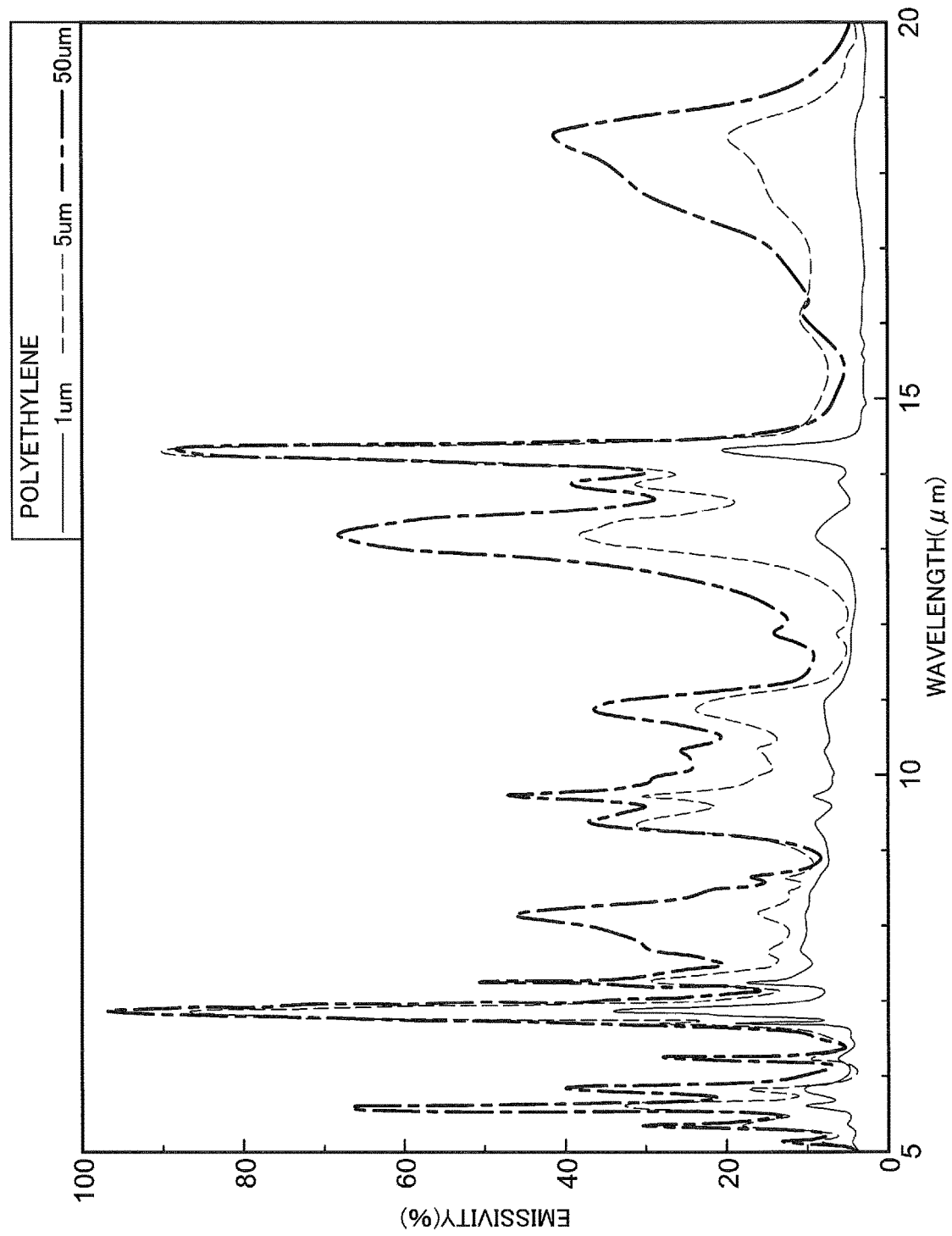
FIG. 15 is a diagram showing an emissivity spectrum of polyethylene.

As shown in FIG. 14, in the case where the protective layer D was formed from the acrylic resin that absorbs ultraviolet rays well, the protective layer D was decomposed by ultraviolet rays and formed radicals, silver was immediately discolored to yellow, and the sample failed to operate as the radiative cooling device CP no longer (absorbed sunlight and the temperature increased under solar radiation, as is the case with common materials).

Note that the line denoted by 600 h in FIG. 14 shows a reflectance spectrum after a xenon weather test (ultraviolet light energy: 60 W/m$^2$) was performed for 600 h (hours) under the conditions specified in JIS 5600-7-7. Also, the line denoted by 0 h shows a reflectance spectrum before the xenon weather test was performed.

Figure 13:
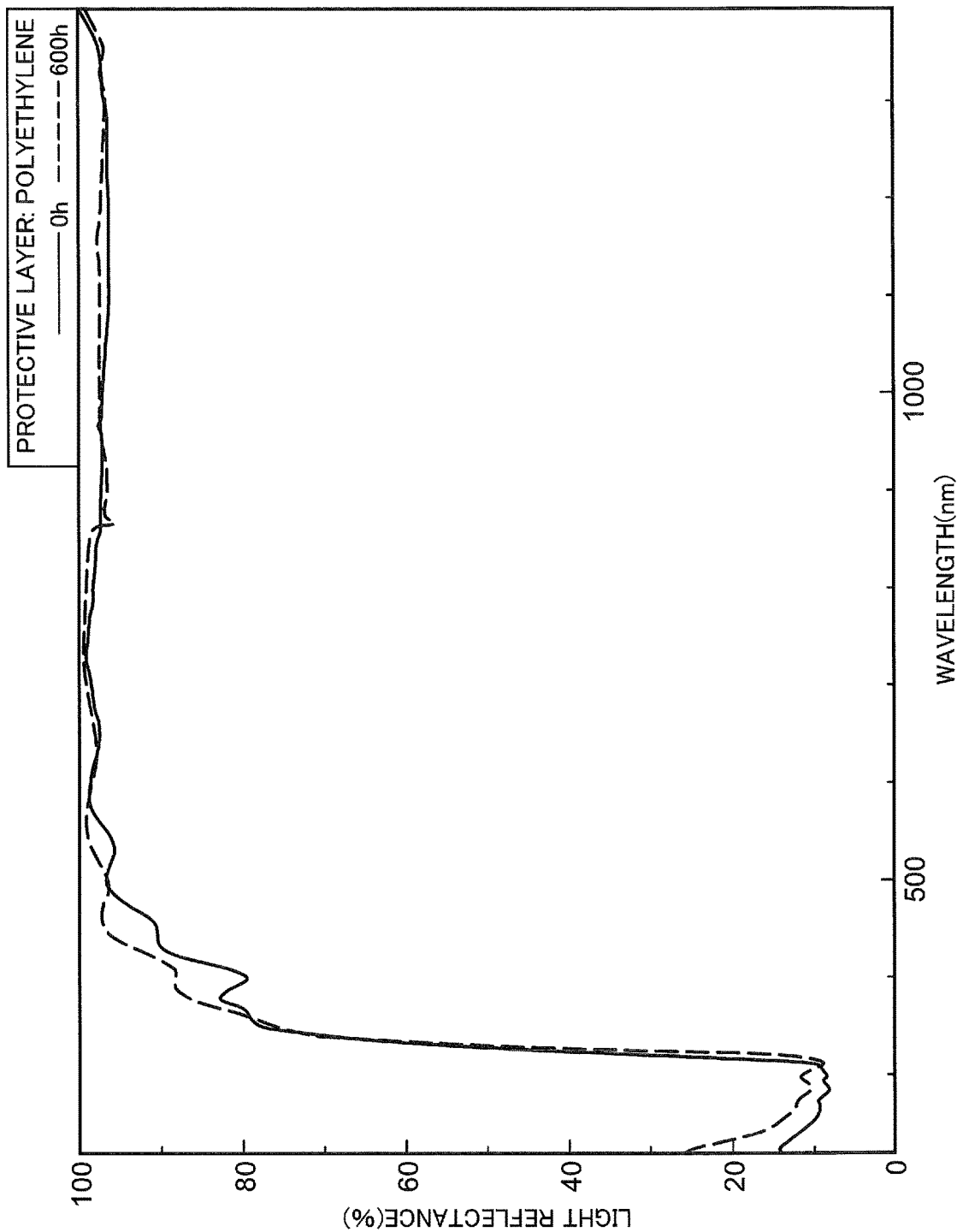
FIG. 13 is a diagram showing a test result of a case where a protective layer was made of polyethylene.

As shown in FIG. 13, in the case where the protective layer D was formed from polyethylene that has a low absorptivity for ultraviolet rays, it can be found that the reflectance did not decrease in the near-infrared range and the visible range. That is, a resin (polyolefin resin) that contains polyethylene as a main component absorbs almost no ultraviolet rays included in the sunlight reaching the ground, and accordingly, is unlikely to form radicals even when irradiated with sunlight.

Therefore, silver included in the light reflective layer B is not colored even under solar radiation.

Note that the line denoted by 600 h in FIG. 13 shows a reflectance spectrum after a xenon weather test (ultraviolet light energy: 60 W/m$^2$) was performed for 600 h (hours) under the conditions specified in JIS 5600-7-7. Also, the line denoted by 0 h shows a reflectance spectrum before the xenon weather test was performed.

Note that the reflectance spectrums in this wavelength range wave because of Fabry-Pérot resonance of the polyethylene layer. It can be found that positions of the resonance slightly differ between the line denoted by 0 h and the line denoted by 600 h due to the thickness of the polyethylene layer being changed by heat applied during the xenon weather test, for example, but no significant decrease in the reflectance due to discoloration of silver to yellow is observed in the ultraviolet-visible range.

Note that a fluorocarbon resin can also be used as a material of the protective layer D from the viewpoint of ultraviolet absorption, but when the protective layer D is actually formed from a fluorocarbon resin, the fluorocarbon resin is colored and deteriorates while the protective layer D is formed. Therefore, the fluorocarbon resin cannot be used as a material of the protective layer D.

Also, silicone can be used as a material of the protective layer D from the viewpoint of ultraviolet absorption, but adhesion between silicone and silver (silver alloy) is very bad, and therefore, silicone cannot be used as a material of the protective layer D.

[Details of Plasticizer]

In the case where a vinyl chloride-based resin is used as the resin material of the resin material layer J, it is preferable to increase flexibility by mixing a plasticizer in the vinyl chloride-based resin.

In this case, the plasticizer mixed in the vinyl chloride-based resin forming the resin material layer J is at least one compound selected from the group consisting of phthalic acid esters, aliphatic dibasic acid esters, and phosphoric acid esters.

The plasticizer is mixed in an amount of 1 part by weight or more and 200 parts by weight or less relative to 100 parts by weight of the vinyl chloride-based resin. From the viewpoint of processing, the plasticizer is preferably mixed in an amount of 100 parts by weight or less.

Any one of or a combination of two or more of the following aliphatic dibasic acid esters may be used as the plasticizer: adipic acid esters, adipic acid ester copolymers, azelaic acid esters, azelaic acid ester copolymers, sebacic acid esters, sebacic acid ester copolymers, succinic acid esters, and succinic acid ester copolymers.

An aliphatic dibasic acid ester used as the plasticizer is preferably formed through ester bonding between an aliphatic dibasic acid and two molecules of a saturated aliphatic alcohol.

Aphthalic acid ester used as the plasticizer is preferably formed through ester bonding between phthalic acid and two molecules of a saturated aliphatic alcohol.

A phosphoric acid ester used as the plasticizer is preferably a phosphoric acid triester or an aromatic phosphoric acid ester.

<Details of Phthalic Acid Esters>

Examples of phthalic acid esters include:
dimethyl phthalate (DMP), diethyl phthalate (DEP), dibutyl phthalate (DPP), di-2-ethylhexyl phthalate (DOP), diisononyl phthalate (DINP), diisodecyl phthalate (DIDP), diundecyl phthalate (DUP), ditridecyl phthalate (DTDP), bis(2-ethylhexyl) terephthalate (DOTP), and bis(2-ethylhexyl) isophthalate (DOIP).

<Details of Aliphatic Dibasic Acid Esters>

Examples of aliphatic dibasic acid esters include:
dibutyl adipate (DBA), diisobutyl adipate (DIBA), di-2-ethylhexyl adipate (DOA), diisononyl adipate (DINA), diisodecyl adipate (DIDA), bis-2-ethylhexyl azelate (DOZ), dibutyl sebacate (DBS), di-2-ethylhexyl sebacate (DOS), diisononyl sebacate (DINS), and diethyl succinate (DESU).

Examples of aliphatic dibasic acid esters also include an aliphatic polyester having a molecular weight of 400 to 4000 and synthesized through copolymerization (polyesterification) between a dibasic acid such as adipic acid and a diol (difunctional alcohol or glycol).

<Phosphoric Acid Triester>

Examples of phosphoric acid triesters include:
trimethyl phosphate (TMP), triethyl phosphate (TEP), tributyl phosphate (TBP), and tris(2-ethylhexyl) phosphate (TOP).

<Aromatic Phosphoric Acid Ester>

Examples of aromatic phosphoric acid esters include:
triphenyl phosphate (TPP), tricresyl phosphate (TCP), trixylenyl phosphate (TXP), cresyl diphenyl phosphate (CDP), and 2-ethylhexyldiphenyl phosphate.

<Evaluation of Suitable Plasticizer>

Plasticizers used for a vinyl chloride-based resin include phthalic acid esters, aliphatic dibasic acid esters, phosphoric acid triesters, aromatic phosphoric acid esters, trimellitic acid esters, and epoxidized aliphatic acid esters. Compounds listed below were selected from these plasticizers, and 43 parts by weight of each plasticizer was mixed relative to 100 parts by weight of a vinyl chloride-based resin and evaluated with use of a xenon weather test.

Note that 0.5 parts by weight of a triazine-based ultraviolet absorbing agent and 0.5 parts by weight of a hindered amine photostabilizer were kneaded with 100 parts by weight of the vinyl chloride-based resin.

Di-2-ethylhexyl phthalate (DOP) and diisodecyl phthalate (DIDP) were selected as representative examples of phthalic acid esters.

Di-2-ethylhexyl adipate (DOA), a butanediol adipate copolymer (average molecular weight: about 1000), and diisononyl adipate (DINA) were selected as representative examples of aliphatic dibasic acid esters.

Tributyl phosphate (TBP) was selected as a representative example of phosphoric acid triesters.

Tricresyl phosphate (TCP) was selected as a representative example of aromatic phosphoric acid esters.

Tris(2-ethylhexyl) trimellitate (TOTM) was selected as a representative example of trimellitic acid esters.

Epoxidized soybean oil was selected as a representative example of epoxidized aliphatic acid esters.

Durability was evaluated based on results of a durability test in which a xenon weather test was performed for 1920 hours (corresponding to 4 years of outdoor exposure). Note that 487 hours correspond to one year in terms of ultraviolet rays.

The xenon weather test was performed under the following conditions.

UV intensity: 180 W/m$^2$ (wavelength: 295 to 400 nm)
<Conditions without water sprinkling>BPT: 89° C., humidity: 50%, 1 hour and 42 minutes.
<Conditions with water sprinkling>temperature in the chamber: 38° C., humidity: 90%, 18 minutes.

Figure 16:
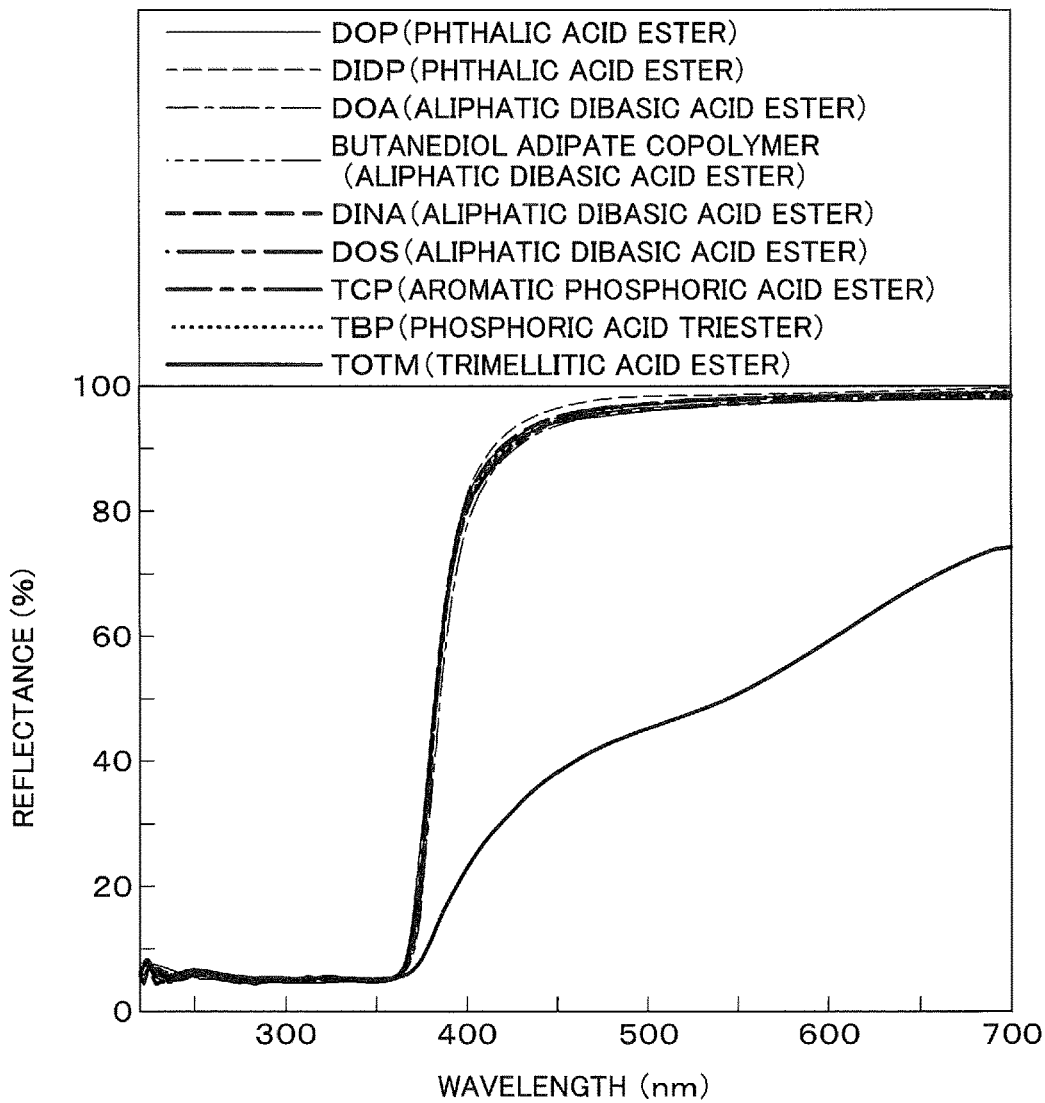
FIG. 16 is a diagram showing test results of plasticizers mixed with a vinyl chloride resin.

FIG. 16 shows results of the test carried out for 1920 hours. Note that a vinyl chloride resin was used for the experiment in the present embodiment, but similar results can be obtained for a vinylidene chloride resin as well.

Through the experiment described above, it was found that durability significantly decreased in the cases where a trimellitic acid ester (TOTM) and an epoxidized aliphatic acid ester (epoxidized soybean oil) were used as plasticizers. Note that the result of the epoxidized aliphatic acid ester is not shown in FIG. 16 because discoloration to brown occurred once 1120 hours had elapsed and the test could not be continued.

On the other hand, it was found that when phthalic acid esters, aliphatic dibasic acid esters, phosphoric acid triesters, and aromatic phosphoric acid esters are used, the radiative cooling device CP can be sufficiently durable to be used for about 4 years. That is, it was found that when phthalic acid esters, aliphatic dibasic acid esters, phosphoric acid triesters, and aromatic phosphoric acid esters are used as plasticizers mixed with the vinyl chloride-based resin, the reflectance of the radiative cooling device CP does not decrease even when about 4 years elapses, but when trimellitic acid esters and epoxidized aliphatic acid esters are used as plasticizers mixed with the vinyl chloride-based resin, the reflectance of the radiative cooling device CP significantly decreases before about 4 years elapses.

The test results described above show that excellent durability can be obtained with use of phthalic acid esters, aliphatic dibasic acid esters, phosphoric acid triesters, and aromatic phosphoric acid esters as plasticizers for the vinyl chloride-based resin, but sufficient durability cannot be obtained with use of trimellitic acid esters and epoxidized aliphatic acid esters.

Reasons for this will be considered and systematized later.

[Other Additives]

A flame retardant, a stabilizer, an auxiliary stabilizer, a filler, an antioxidant, an ultraviolet absorbing agent, and a photostabilizer may be added to the vinyl chloride-based resin forming the resin material layer J.

<Flame Retardant>

Examples of the flame retardant include: an inorganic compound such as aluminum hydroxide, antimony trioxide, magnesium hydroxide, or zinc borate; a phosphorus-based compound such as cresyl diphenyl phosphate, tris chloroethyl phosphate, tris chloropropyl phosphate, or tris dichloropropyl phosphate; and a halogen-based compound such as chlorinated paraffin. The amount of flame retardant relative to 100 parts by weight of the vinyl chloride-based resin is about 0.1 to 20 parts by weight.

<Stabilizer>

Examples of the stabilizer include: a metal soap compound such as lithium stearate, magnesium stearate, magnesium laurate, calcium ricinoleate, calcium stearate, barium laurate, barium ricinoleate, barium stearate, zinc octylate, zinc laurate, zinc ricinoleate, or zinc stearate; an organotin-based compound such as dimethyltin bis-2-ethylhexyl thioglycolate, dibutyltin maleate, dibutyltin bis butyl maleate, or dibutyltin dilaurate; and an antimony mercaptide compound. The amount of stabilizer relative to 100 parts by weight of the vinyl chloride-based resin is about 0.1 to 20 parts by weight.

<Auxiliary Stabilizer>

Examples of the auxiliary stabilizer include: a phosphite-based compound such as triphenyl phosphite, monooctyl diphenyl phosphite, or tridecyl phosphite; a beta-diketone compound such as acetylacetone or benzoylacetone; a polyol compound such as glycerin, sorbitol, pentaerythritol, or polyethylene glycol; a perchlorate compound such as a perchloric acid barium salt or a perchloric acid sodium salt; a hydrotalcite compound; and zeolite. The amount of auxiliary stabilizer relative to 100 parts by weight of the vinyl chloride-based resin is about 0.1 to 20 parts by weight.

<Filler>

Examples of the filler include: a metal oxide such as calcium carbonate, silica, alumina, clay, talc, diatomaceous earth, or ferrite; a fiber and powder of glass, carbon, or metal; glass spheres, graphite, aluminum hydroxide, barium sulfate, magnesium oxide, magnesium carbonate, magnesium silicate, and calcium silicate. The amount of filler relative to 100 parts by weight of the vinyl chloride-based resin is about 1 to 100 parts by weight.

<Antioxidant>

Examples of the antioxidant include: a phenolic compound such as 2,6-di-tert-butylphenol, tetrakis[methylene-3-(3,5-tert-butyl-4-hydroxyphenol) propionate]methane, or 2-hydroxy-4-methoxybenzophenone; a sulfur-based compound such as an alkyl disulfide, a thiodipropionic acid ester, or benzothiazole; a phosphoric acid-based compound such as tris nonylphenyl phosphite, diphenyl isodecyl phosphite, triphenyl phosphite, or tris(2,4-di-tert-butylphenyl) phosphite; and an organic metal-based compound such as zinc dialkyl dithiophosphate or zinc diaryl dithiophosphate. The amount of antioxidant relative to 100 parts by weight of the vinyl chloride-based resin is about 0.2 to 20 parts by weight.

<Ultraviolet Absorbing Agent>

Examples of the ultraviolet absorbing agent include: a salicylate compound such as phenyl salicylate or p-tert-butylphenyl salicylate; a benzophenone compound such as 2-hydroxy-4-n-octoxybenzophenone or 2-hydroxy-4-n-methoxybenzophenone; a benzotriazole compound such as 5-methyl-1H-benzotriazole or 1-dioctylaminomethylbenzotriazole; a cyanoacrylate compound; and a triazine compound. The amount of ultraviolet absorbing agent relative to 100 parts by weight of the vinyl chloride-based resin is about 0.1 to 10 parts by weight.

<Photostabilizer>

Examples of the photostabilizer include bis(2,2,6,6-tetramethyl-4-piperidyl) sebacate, bis(1,2,2,6,6-pentamethyl-4-piperidyl) sebacate, and methyl 1,2,2,6,6-pentamethyl-4-piperidyl sebacate (mixture), bis(1,2,2,6,6-pentamethyl-4-piperidyl)[[3,5-bis(1,1-dimethylethyl)-4-hydroxyphenyl] methyl]butyl malonate, decanedioic acid bis(2,2,6,6-tetramethyl-1(octyloxy)-4-piperidyl) ester, a reaction product of 1,1-dimethyl ethyl hydroperoxide and octane, 4-benzoyloxy-2,2,6,6-tetramethylpiperidine, an ester mixture of 2,2,6,6-tetramethyl-4-piperidinol and a higher fatty acid, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, a polycondensate of dimethyl succinate and 4-hydroxy-2,2,6,6-tetramethyl-1-piperidineethanol, poly[{(6-(1,1,3,3-tetramethylbutyl)amino-1,3,5-triazine-2,4-diyl){(2,2,6,6-tetramethyl-4-piperidyl)imino} hexamethylene{(2,2,6,6-tetramethyl-4-piperidyl)imino}}, a polycondensate of dibutylamine-1,3,5-triazine-N,N'-bis(2,2,6,6-tetramethyl-4-piperidyl-1,6-hexamethylenediamine and N-(2,2,6,6-tetramethyl-4-piperidyl)butylamine, and a hindered amine such as N,N',N'',N'''-tetrakis-(4,6-bis-(butyl-(N-methyl-2,2,6,6-tetramethylpiperidine-4-yl)amino)-triazine-2-yl)-4,7-diazadecane-1,10-diamine. The amount of photostabilizer relative to 100 parts by weight of the vinyl chloride-based resin is about 0.1 to 10 parts by weight.

[Consideration on Plasticizer]

The following considers the plasticizer mixed in the vinyl chloride-based resin.

(Deterioration of Vinyl Chloride-Based Resin)

Deterioration of the plasticizer due to ultraviolet rays is significantly involved in deterioration of the vinyl chloride-based resin (film) due to sunlight.

Commonly, a vinyl chloride-based resin (in which a plasticizer is mixed) that is used outdoors for a long period of time is protected from ultraviolet rays included in sunlight by being colored or containing an additive. For example, the vinyl chloride-based resin is often colored in black so as not to be affected by ultraviolet rays. On the other hand, in the case of the radiative cooling device CP, absorption of sunlight needs to be minimized in order for the radiative cooling device CP to have radiative cooling properties. Therefore, it is not possible to add a sufficient amount of additive, dye, or pigment for protecting the plasticizer.

The radiative cooling device CP includes: the adhesive layer N and the protective layer D under the resin material layer J formed by the vinyl chloride-based resin; and the light reflective layer B including silver under the protective layer D. The resin material layer J is more likely to be affected by sunlight under the influence of the light reflective layer B. That is, sunlight that has entered the radiative cooling device CP is reflected by the light reflective layer B, and accordingly, passes through the resin material layer J twice. That is, the influence of sunlight on deterioration is about twice as much as that of an ordinary case.

Also, the radiative cooling device CP including the resin material layer J that is formed on the light reflective layer B including silver is affected by sunlight more than a radiative cooling device CP including a resin material layer J that is formed on aluminum, iron, or ceramics whose reflectance is lower than that of silver.

These findings suggest that the vinyl chloride-based resin in the radiative cooling device CP in which the resin material layer J is formed on the light reflective layer B including silver is more sensitive to ultraviolet rays included in sunlight than general-purpose vinyl chloride-based resins.

Deterioration of an ester plasticizer due to ultraviolet rays occurs mainly as a result of the plasticizer absorbing UV energy.

Absorption of ultraviolet rays occurs mainly through electron transition that involves energy higher than bond energy of an ester bond included in the plasticizer. Hydrolysis of the plasticizer mixed in the vinyl chloride-based resin progresses in the presence of water molecules and activation energy received from ultraviolet rays.

When a bond included in the plasticizer is cut off, the cut bond attacks surrounding molecules of the vinyl chloride-based resin, causing dehydrochlorination or the like, and the vinyl chloride-based resin is colored. Moreover, mechanical strength also deteriorates.

When the vinyl chloride-based resin is colored, the radiative cooling device CP absorbs sunlight, and accordingly, cannot cool the cooling target during the day.

Therefore, plasticizers (trimellitic acid esters and epoxidized aliphatic acid esters) that are used outdoors while being directly exposed to sunlight in other applications cannot be used for the radiative cooling device CP, and it is possible to use phthalic acid esters, aliphatic dibasic acid esters, phosphoric acid triesters, and aromatic phosphoric acid esters as plasticizers in the radiative cooling device CP as indicated by the experimental result shown in FIG. 16.

(Suitable Plasticizer and Unsuitable Plasticizer)

Plasticizers that are suitable to be mixed in the vinyl chloride-based resin are phthalic acid esters, aliphatic dibasic acid esters, phosphoric acid triesters, and aromatic phosphoric acid esters as described above.

It is preferable that an aliphatic dibasic acid ester is formed through ester bonding between an aliphatic dibasic acid and two molecules of a saturated aliphatic alcohol. It is preferable that a phthalic acid ester is formed through ester bonding between phthalic acid and two molecules of a saturated aliphatic alcohol.

Also, as for each of the phthalic acid esters, aliphatic dibasic acid esters, and phosphoric acid triesters, it is desirable that a hydrocarbon group included in the ester is an alkyl group.

Unsuitable plasticizers are trimellitic acid esters and epoxidized aliphatic acid esters as described above.

Unsuitable plasticizers also include phthalic acid esters, aliphatic dibasic acid esters, and phosphoric acid triesters in which the hydrocarbon group is an unsaturated hydrocarbon group. That is, it is desirable that the hydrocarbon group included in phthalic acid esters, aliphatic dibasic acid esters, and phosphoric acid triesters is a saturated hydrocarbon group.

When the hydrocarbon group is an unsaturated hydrocarbon group, the unsaturated bond causes coloration, and accordingly, sunlight is absorbed well and the radiative cooling properties are reduced. Also, the unsaturated bond is cleaved by absorbed sunlight, and a reaction with a surrounding oligomer and the vinyl chloride-based resin progresses. As a result, the resin material layer J of the radiative cooling device CP becomes brittle and is colored.

In short, whether a plasticizer is suitable or unsuitable depends on whether or not the plasticizer absorbs ultraviolet rays well.

[Consideration on Addition of Filler]

Figure 17:
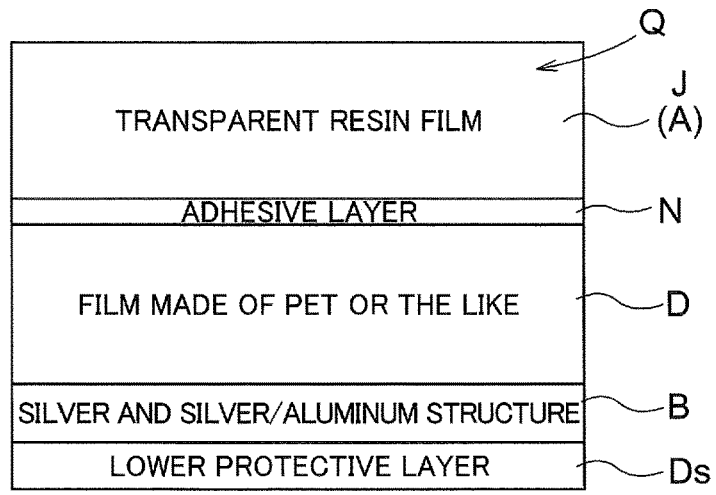
FIG. 17 is a diagram showing a radiative cooling device in which a filler is mixed in the resin material layer.
Figure 18:
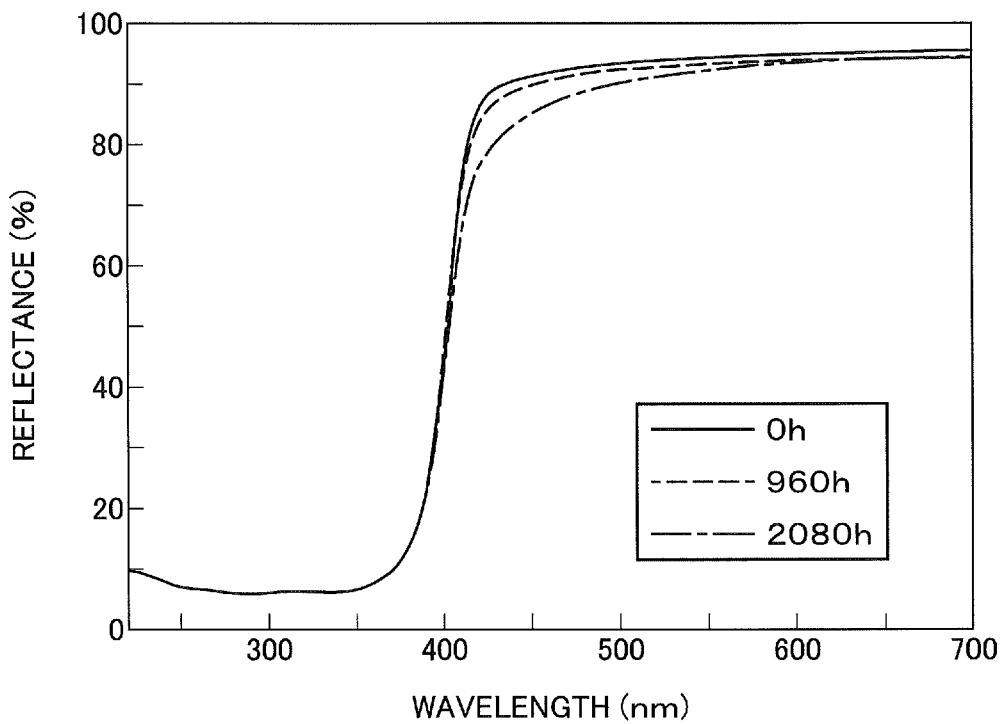
FIG. 18 is a diagram showing a test result of a case where a filler was mixed in the resin material layer.

When a radiative cooling device CP in which titanium oxide (rutile type) is mixed as a filler Q in the resin material layer J is produced as shown in FIG. 17, and a xenon weather test is performed on the radiative cooling device CP, the reflectance of the radiative cooling device CP decreases over time in the ultraviolet-visible range as shown in FIG. 18. In other words, the absorptivity of the radiative cooling device CP for sunlight increases and the radiative cooling device CP is discolored to yellow.

Note that the titanium oxide (rutile type) used as the filler Q has a primary particle diameter of about 100 nm or more and 1 μm or less, or preferably about 200 nm, and is provided with an alumina-silica coating.

Figure 19:
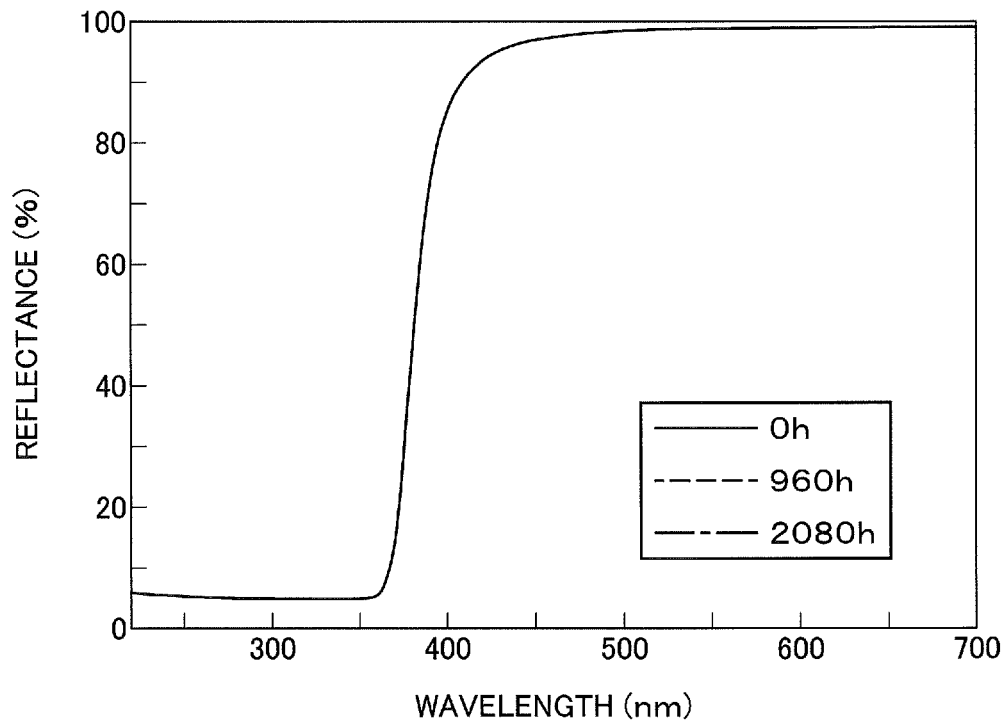
FIG. 19 is a diagram showing a test result of a case where a filler was not mixed in the resin material layer.

When a radiative cooling device CP (not shown) in which a filler is not mixed in the resin material layer J, the protective layer D, and the adhesive layer N is produced, and a xenon weather test is performed on the radiative cooling device CP, in which a filler is not mixed in the resin material layer J, the absorptivity of the radiative cooling device CP for sunlight does not increase even when 2000 hours elapses as shown in FIG. 19, and the radiative cooling device CP is not discolored to yellow.

Note that 2000 h (hours) corresponds to 4 years of outdoor exposure.

In FIGS. 18 and 19, the line denoted by 960 h and the line denoted by 2080 h show reflectance spectrums after the xenon weather test (ultraviolet light energy: 60 W/m$^2$) was performed for 960 h (hours) and 2080 h (hours), respectively, under the conditions specified in JIS 5600-7-7. Also, the line denoted by 0 h shows a reflectance spectrum before the xenon weather test was performed.

As described above, the radiative cooling device CP in which titanium oxide (rutile type) is mixed as the filler Q in the resin material layer J is deteriorated earlier than the radiative cooling device CP in which the filler Q is not mixed, when the radiative cooling devices are used outdoors. This is presumably because of a solid acid effect of the titanium oxide.

That is, there are a rutile type of titanium oxide and an anatase type of titanium oxide, and the anatase type titanium oxide has a photocatalytic effect, but the rutile type titanium oxide does not exhibit photocatalytic activity. Furthermore, the filler is provided with the inorganic coating (alumina-silica coating). Accordingly, it is thought that the radiative cooling device CP is not deteriorated due to the photocatalytic effect. Therefore, it is thought that the radiative cooling device CP is deteriorated as a result of a reaction between moisture included in air or rain, the vinyl chloride-based resin, and the plasticizer having progressed due to the solid acid effect of the titanium oxide (rutile type).

Figure 20:
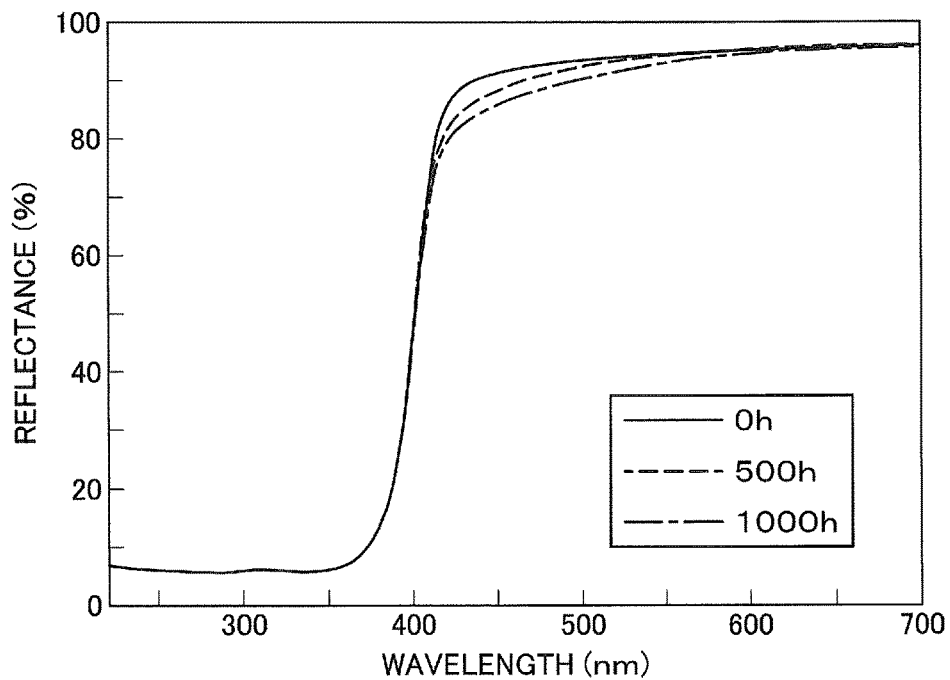
FIG. 20 is a diagram showing a test result of a case where a filler was mixed in the resin material layer.
Figure 21:
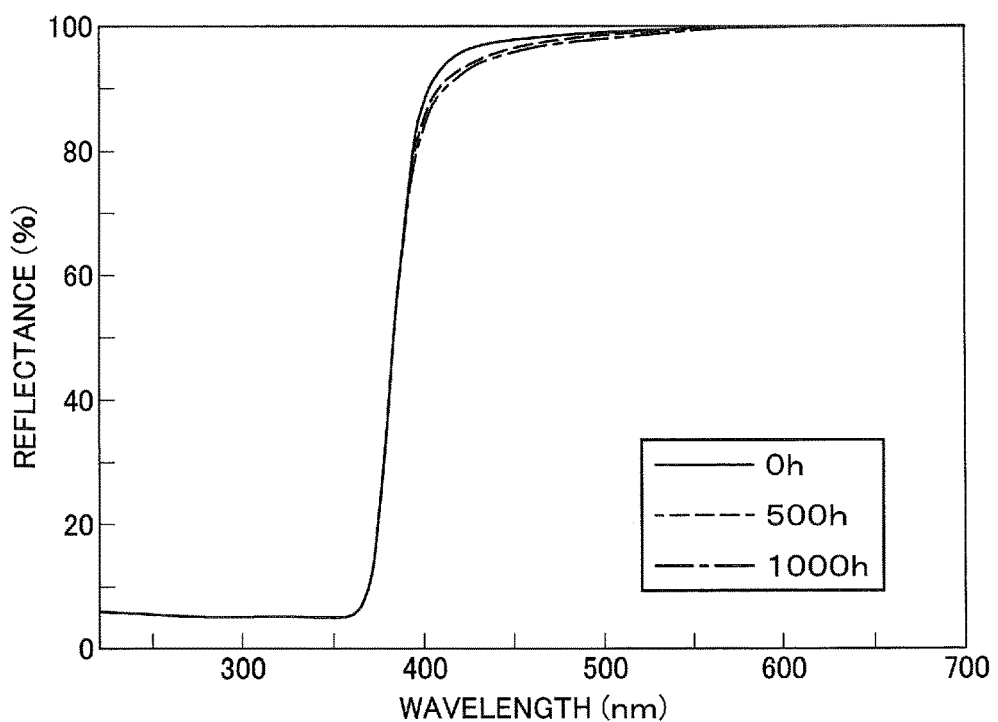
FIG. 21 is a diagram showing a test result of a case where a filler was not mixed in the resin material layer.

FIG. 20 shows a result of a high-temperature high-humidity test performed on a radiative cooling device CP in which titanium oxide (rutile type) was mixed as a filler Q in the resin material layer J, and FIG. 21 shows a result of the high-temperature high-humidity test performed on a radiative cooling device CP in which a filler was not mixed.

In FIGS. 20 and 21, the line denoted by 500 h and the line denoted by 1000 h show reflectance spectrums after the high-temperature high-humidity test was performed at a temperature of 65° C. and a humidity of 85%. Also, the line denoted by 0 h shows a reflectance spectrum before the high-temperature high-humidity test was performed at a temperature of 65° C. and a humidity of 85%.

From the results of the high-temperature high-humidity test, it can be found that deterioration of the radiative cooling device CP including the titanium oxide (rutile type) as the filler Q progressed in the absence of ultraviolet rays when compared with the radiative cooling device CP in which titanium oxide (rutile type) was not mixed as the filler Q. From the results of this test, it is presumed that deterioration of the radiative cooling device CP progresses due to the configuration in which the titanium oxide (rutile type) is likely to come into contact with moisture in the air.

Next, a xenon weather test was performed on a radiative cooling device CP in which titanium oxide (rutile type) provided with an alumina-silica coating was mixed as the filler Q in the adhesive layer N as described above. That is, a durability test was performed on the radiative cooling device CP in which the titanium oxide used as the filler Q was kept away from moisture included in air and rain due to the presence of the resin material layer J. As a result, the absorptivity of the radiative cooling device CP for sunlight did not increase even when 2000 hours elapsed as shown in FIG. 22, and the radiative cooling device CP was not discolored to yellow.

Note that the resin material layer J was designed to absorb ultraviolet rays in a range from 295 to 350 nm included in sunlight by mixing an ultraviolet absorbing agent in the resin material layer J.

Figure 22:
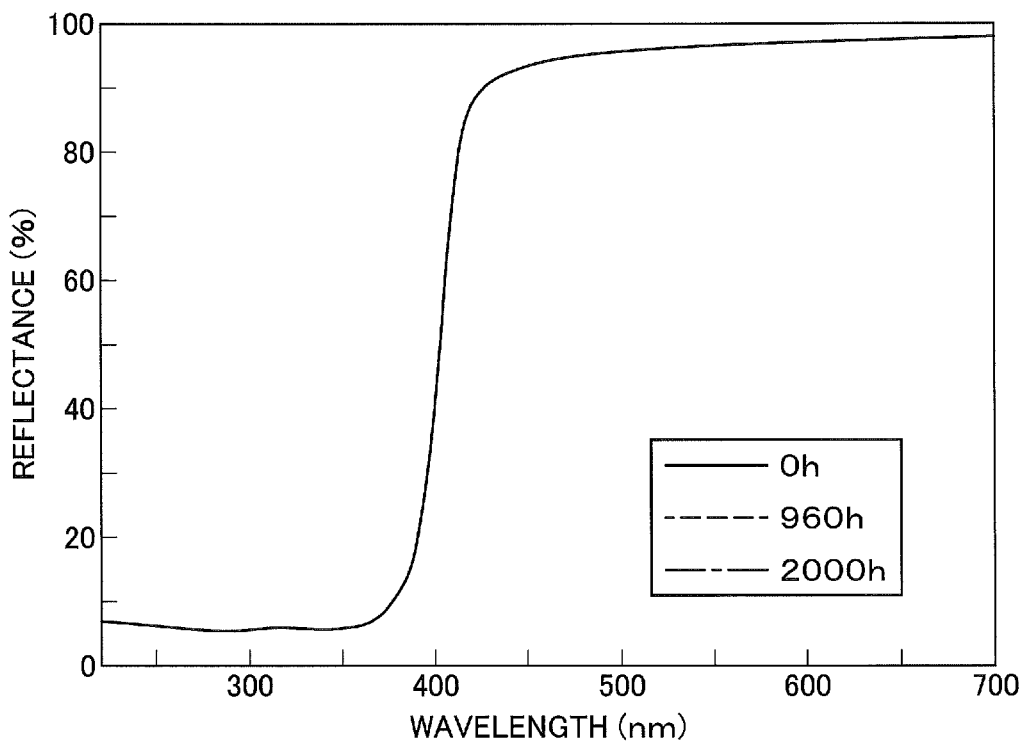
FIG. 22 is a diagram showing a test result of a case where a filler was mixed in an adhesive layer.

In FIG. 22, the line denoted by 960 h and the line denoted by 2000 h show reflectance spectrums after the xenon weather test (ultraviolet light energy: 60 W/m$^2$) was performed for 960 h (hours) and 2000 h (hours) under the conditions specified in JIS 5600-7-7. Also, the line denoted by 0 h shows a reflectance spectrum before the xenon weather test was performed.

From the result of the test described above, it was found that deterioration of the radiative cooling device CP was suppressed as a result of the layer (adhesive layer N) including titanium oxide as the filler Q being kept away from moisture and water. That is, durability of the radiative cooling device CP increases when the filler Q is mixed in the adhesive layer.

Note that when the filler Q is mixed in the protective layer D, the reflectance of the light reflective layer B decreases as described later.

[Another Configuration of Infrared Radiative Layer]

Figure 23:
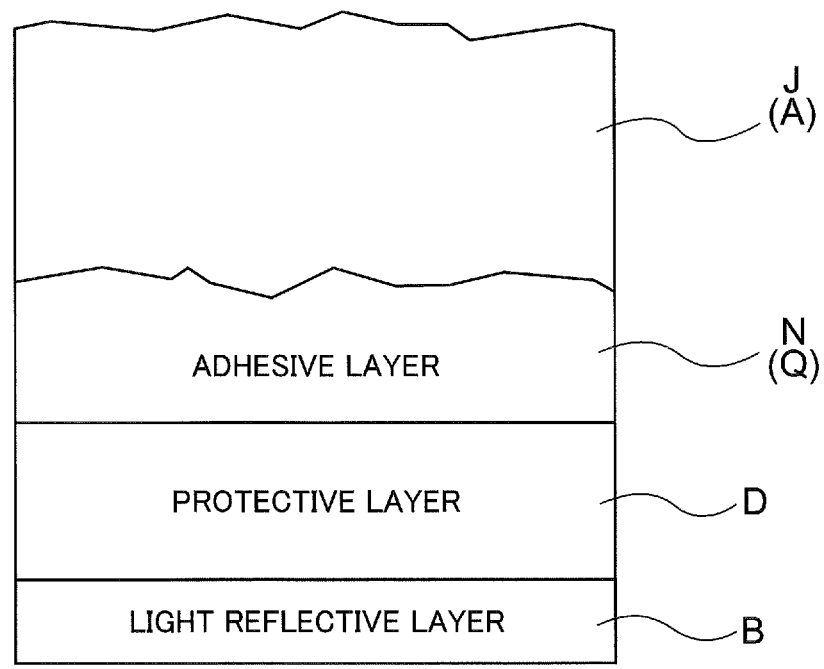
FIG. 23 is a diagram showing a configuration in which irregularities are formed in front and rear surfaces of the resin material layer.

As shown in FIG. 23, irregularities may be formed in front and rear surfaces of the resin material layer J constituting the infrared radiative layer A to provide a light scattering configuration.

With this configuration, it is possible to suppress glare on the radiative surface H when the radiative surface H is seen.

That is, front and rear surfaces of the resin material layer J described above are both flat and a filler Q is not mixed in the resin material layer J. In this case, the radiative surface H is a mirror surface and there is glare when the radiative surface H is seen, but the glare can be suppressed with the light scattering configuration.

Irregularities can be formed in both of the front and rear surfaces of the resin material layer J through embossing processing or processing for scratching the surfaces, for example.

The resin material layer J and the protective layer D can be joined appropriately even if the rear surface of the resin material layer J has irregularities because the adhesive layer N is disposed between the resin material layer J and the protective layer D.

When the filler Q is mixed in the protective layer D, irregularities are formed in the rear surface of the protective layer D that comes into contact with the light reflective layer B, and consequently irregularities are formed in the surface of the light reflective layer B, and therefore, the filler Q needs to be kept from being mixed in the protective layer D. That is, when irregularities are formed in the surface of the light reflective layer B, the light reflective layer B cannot reflect light appropriately, and consequently, radiative cooling cannot be performed appropriately.

In this regard, an experimental result will be described based on FIG. 24.

Figure 24:
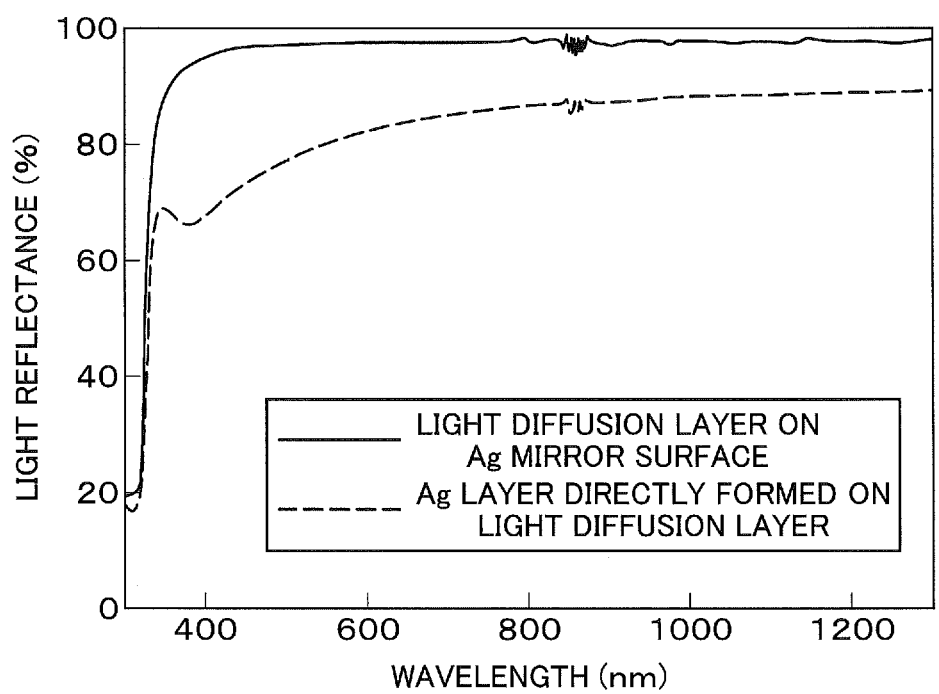
FIG. 24 is a graph showing an experimental result.

In FIG. 24, "Ag layer directly formed on light diffusion layer" means that the light reflective layer B was formed from silver (Ag) through vapor deposition or the like on a surface of the infrared radiative layer A (resin material layer J) in which the filler Q was mixed or irregularities were formed through embossing processing in a surface facing the Ag layer, i.e., the light reflective layer B.

Also, "light diffusion layer on Ag mirror surface" means that the upper surface of the Ag layer, i.e., the light reflective layer B, was formed into a mirror surface, and the protective layer D and the infrared radiative layer A (resin material layer J) in which the filler Q was mixed or irregularities were formed through embossing processing were stacked on the Ag layer.

As shown in FIG. 24, in the case of "Ag layer directly formed on light diffusion layer", irregularities were formed in a surface of the light reflective layer B, and therefore, the light reflectance significantly decreased, but in the case of "light diffusion layer on Ag mirror surface", the mirror surface of the light reflective layer B was maintained and an appropriate reflectance was obtained.

Other Embodiments

Other embodiments are listed below.
(1) In the above embodiment, an object that is in close contact with the rear surface of the radiative cooling device CP (radiative cooling film) is described as an example of the cooling target E, but the radiative cooling device CP is applicable to various cooling targets E such as a space to be cooled.
(2) In the above embodiment, configurations in which the radiative surface H of the resin material layer J is exposed are described as examples, but a configuration is also possible in which the radiative surface H is covered with a hard coat.

Examples of materials of the hard coat include a UV-curable acrylic material, a thermosetting acrylic material, a UV-curable silicone material, a thermosetting silicone material, an organic-inorganic hybrid material, and a vinyl chloride-based resin, and any of these may be used. An organic antistatic agent may also be used as an additive.

Among UV-curable acrylic materials, urethane acrylate is particularly preferable.

The hard coat can be formed through gravure coating, bar coating, knife coating, roll coating, blade coating, die coating, or the like.

The thickness of the hard coat (coating layer) is 1 to 50 µm, and particularly preferably 2 to 20 µm.

The configurations disclosed in the above embodiments (including the other embodiments, the same applies hereinafter) can be applied in combination with configurations disclosed in other embodiments so long as no contradiction arises. Also, the embodiments disclosed in the present specification are examples, and embodiments of the present invention are not limited to the disclosed embodiments, and can be modified as appropriate within a range not deviating from the object of the present invention.

DESCRIPTION OF REFERENCE SIGNS

A: infrared radiative layer
B: light reflective layer
D: protective layer
H: radiative surface
J: resin material layer
N: adhesive layer
Q: filler

The invention claimed is:
1. A radiative cooling device comprising:
an infrared radiative layer having a radiative surface for radiating infrared light;
a light reflective layer on a side of the infrared radiative layer, which is opposite to the radiative surface; and
a protective layer between the infrared radiative layer and the light reflective layer, and
wherein:
the infrared radiative layer is a resin material layer that has a thickness adjusted so that the resin material layer emits heat radiation energy greater than absorbed solar energy in a wavelength range from 8 µm to 14 µm,
the light reflective layer comprises silver or a silver alloy,
the protective layer comprises a polyolefin resin or a polyethylene terephthalate resin,
the radiative cooling device further comprises an adhesive layer between the resin material layer and the protective layer, the adhesive layer joining the resin material layer to the protective layer, and
the adhesive layer comprises a filler made of an inorganic material.
2. The radiative cooling device according to claim 1, wherein the adhesive layer comprises an adhesive agent or a pressure-sensitive adhesive agent selected from the group consisting of a urethane adhesive agent, a urethane pressure-sensitive adhesive agent, an acrylic adhesive agent, an acrylic pressure-sensitive adhesive agent, an ethylene vinyl acetate adhesive agent, and an ethylene vinyl acetate pressure-sensitive adhesive agent.
3. The radiative cooling device according to claim 1, wherein the filler is included in an amount of 0.1 to 40 wt % relative to the adhesive layer.
4. The radiative cooling device according to claim 1, wherein the filler comprises any one selected from the group consisting of silicon dioxide, titanium oxide, aluminum oxide, magnesium oxide, and calcium carbonate.
5. The radiative cooling device according to claim 1, wherein the filler comprises titanium oxide.
6. The radiative cooling device according to claim 5, wherein the titanium oxide is provided with at least one of an alumina coating, a silica coating, and a zirconia coating.
7. The radiative cooling device according to claim 1, wherein the thickness of the resin material layer is adjusted so that the resin material layer has:
light absorption properties that allow for a wavelength average absorptivity of 13% or less in a wavelength range from 0.4 µm to 0.5 µm, a wavelength average absorptivity of 4% or less in a wavelength range from 0.5 µm to 0.8 µm, a wavelength average absorptivity of 1% or less in a wavelength range from 0.8 µm to 1.5 µm, and a wavelength average absorptivity of 40% or less in a wavelength range from 1.5 µm to 2.5 µm; and
heat radiation properties that allow for a wavelength average emissivity of 40% or more in the wavelength range from 8 µm to 14 µm.
8. The radiative cooling device according to claim 1, wherein the resin material layer comprises a vinyl chloride resin or a vinylidene chloride resin as a resin material, and
the resin material layer has a thickness of 10 µm or more and 100 µm or less.
9. The radiative cooling device according to claim 1, wherein the resin material layer comprises a vinyl fluoride resin or a vinylidene fluoride resin as a resin material, and
wherein the resin material layer has a thickness of 300 µm or less.
10. The radiative cooling device according to claim 1, wherein the resin material layer comprises a vinyl chloride-based resin as a resin material in which a plasticizer is mixed, and
wherein the plasticizer is at least one compound selected from the group consisting of phthalic acid esters, aliphatic dibasic acid esters, and phosphoric acid esters.
11. The radiative cooling device according to claim 10, wherein the plasticizer is mixed in an amount of 1 part by weight or more and 200 parts by weight or less relative to 100 parts by weight of the vinyl chloride-based resin.

12. The radiative cooling device according to claim 10, wherein the plasticizer comprises a phosphoric acid ester that is a phosphoric acid triester or an aromatic phosphoric acid ester.

13. The radiative cooling device according to claim 1, wherein the light reflective layer has a reflectance of 90% or more in a wavelength range from 0.4 µm to 0.5 µm, and a reflectance of 96% or more with respect to light having a wavelength longer than 0.5 µm.

14. The radiative cooling device according to claim 1, wherein the light reflective layer comprises silver or a silver alloy and has a thickness of 50 nm or more.

15. The radiative cooling device according to claim 1, wherein the light reflective layer has a layered structure comprising (i) silver or a silver alloy adjacent to the protective layer and (ii) aluminum or an aluminum alloy apart from the protective layer.

16. The radiative cooling device according to claim 1, wherein when the protective layer comprises the polyolefin resin, the protective layer has a thickness of 300 nm or more and 40 µm or less, or wherein when the protective layer comprises the polyethylene terephthalate resin, the protective layer has a thickness of 17 µm or more and 40 µm or less.

17. The radiative cooling device according to claim 1, wherein the resin material layer, the protective layer, and the light reflective layer are stacked on one another in a form of a film.

18. The radiative cooling device according to claim 1, wherein the resin material layer has a front surface and a rear surface that have irregularities.

19. A radiative cooling device comprising:
an infrared radiative layer having a radiative surface for radiating infrared light;
a light reflective layer on a side of the infrared radiative layer, which is opposite to the radiative surface; and
a protective layer between the infrared radiative layer and the light reflective layer, and
wherein:
the infrared radiative layer is a resin material layer that has a thickness adjusted so that the resin material layer emits heat radiation energy greater than absorbed solar energy in a wavelength range from 8 µm to 14 µm,
the light reflective layer comprises silver or a silver alloy,
the radiative cooling device further comprises an adhesive layer between the resin material layer and the protective layer, the adhesive layer joining the resin material layer to the protective layer, and
the adhesive layer comprises a filler made of an inorganic material, wherein the filler comprises titanium oxide, and wherein the titanium oxide is provided with at least one of an alumina coating, a silica coating, and a zirconia coating.

20. A radiative cooling device comprising:
an infrared radiative layer having a radiative surface for radiating infrared light;
a light reflective layer on a side of the infrared radiative layer, which is opposite to the radiative surface; and
a protective layer between the infrared radiative layer and the light reflective layer, and
wherein:
the infrared radiative layer is a resin material layer that has a thickness adjusted so that the resin material layer emits heat radiation energy greater than absorbed solar energy in a wavelength range from 8 µm to 14 µm, wherein the resin material layer comprises a vinyl chloride-based resin as a resin material in which a plasticizer is mixed, and wherein the plasticizer comprises a phosphoric acid ester that is a phosphoric acid triester or an aromatic phosphoric acid ester,
the light reflective layer comprises silver or a silver alloy,
the radiative cooling device further comprises an adhesive layer between the resin material layer and the protective layer, the adhesive layer joining the resin material layer to the protective layer, and
the adhesive layer comprises a filler made of an inorganic material.

* * * * *